United States Patent
Takano et al.

(10) Patent No.: US 8,963,372 B2
(45) Date of Patent: Feb. 24, 2015

(54) INVERTER AND POWER CONVERTER HAVING INVERTER MOUNTED THEREIN

(75) Inventors: Yoh Takano, Osaka (JP); Tetsuya Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 449 days.

(21) Appl. No.: 13/393,344

(22) PCT Filed: Aug. 31, 2010

(86) PCT No.: PCT/JP2010/064803
§ 371 (c)(1),
(2), (4) Date: Feb. 29, 2012

(87) PCT Pub. No.: WO2011/025029
PCT Pub. Date: Mar. 3, 2011

(65) Prior Publication Data
US 2012/0153727 A1  Jun. 21, 2012

(30) Foreign Application Priority Data

Aug. 31, 2009 (JP) .................................. 2009-200450
Feb. 26, 2010 (JP) .................................. 2010-042970

(51) Int. Cl.
*H02J 1/00* (2006.01)
*H02J 3/00* (2006.01)
(Continued)

(52) U.S. Cl.
CPC ..................................... *H02M 7/483* (2013.01)
USPC ................. 307/75; 307/43; 307/80; 307/130; 363/43; 363/65; 363/71; 363/132; 323/222

(58) Field of Classification Search
None
See application file for complete search history.

(56) References Cited

U.S. PATENT DOCUMENTS 7,122,991 B2  10/2006  Kitajima et al.
7,719,865 B2   5/2010  Iwata et al.
(Continued)

FOREIGN PATENT DOCUMENTS

JP  59-096876       6/1984
JP  61-258676 A    11/1986
(Continued)

OTHER PUBLICATIONS

Notification of Reasons for Refusal JP Patent Applciation No. 2010-191198 dated May 13, 2014 with English translation.
(Continued)

*Primary Examiner* — Jared Fureman
*Assistant Examiner* — Aqeel Bukhari
(74) *Attorney, Agent, or Firm* — McDermott Will & Emery LLP

(57) ABSTRACT

Disclosed is an inverter having improved power conversion efficiency. The inverter (200) converts direct current power supplied from a plurality of direct current power supplies (V1, V2) having different voltages into alternating current power. The inverter (200) is provided with a control unit (20). The control unit (20) generates modified sine waves using a power supply voltage (E1) of the power supplied from the first direct current power supply (V1), a power supply voltage (E2) of the power supplied from the second direct current power supply (V2), and a potential difference (E1−E2) between the two power supply voltages. The control unit (20) generates the modified sine waves by controlling H bridge circuits provided for the direct current power supplies (V1, V2), respectively.

5 Claims, 36 Drawing Sheets

(51) Int. Cl.
*H01H 47/00* (2006.01)
*H02J 1/10* (2006.01)
*H02M 7/48* (2006.01)
*H02M 7/5387* (2007.01)
*H02M 7/483* (2007.01)

(56) References Cited

U.S. PATENT DOCUMENTS

| 8,559,202 B2 | 10/2013 | Iwata et al. | |
|---|---|---|---|
| 2009/0295229 A1* | 12/2009 | Harke | 307/75 |

FOREIGN PATENT DOCUMENTS

| JP | 10-042576 | 2/1998 |
|---|---|---|
| JP | 11-089242 | 3/1999 |
| JP | 2002-359928 | 12/2002 |
| JP | 2004-007941 | 1/2004 |
| JP | 2006-025518 | 1/2006 |
| JP | 2006-25518 A | 1/2006 |
| JP | 2006-238629 A | 9/2006 |
| JP | 2007-124731 A | 5/2007 |

OTHER PUBLICATIONS

International Preliminary Report issued in International Patent Application No. PCT/JP2010/064803 dated Mar. 27, 2012.

International Preliminary Report issued in International Patent Application No. PCT/JP2010/064803 dated Mar. 6, 2012.

International Search Report issued in International Patent Application No. PCT/JP2010/064803 dated Nov. 2, 2010.

* cited by examiner

FIG.5

| GRADATION LEVEL | S11 | S12 | S3 | S4 | S21 | S22 |
|---|---|---|---|---|---|---|
| 0 | OFF | OFF | ON | ON | OFF | OFF |
| 1 | ON | OFF | OFF | OFF | OFF | ON |
| 2 | OFF | OFF | OFF | ON | ON | OFF |
| 3 | ON | OFF | OFF | ON | OFF | OFF |
| −1 | OFF | ON | OFF | OFF | ON | OFF |
| −2 | OFF | OFF | ON | OFF | OFF | ON |
| −3 | OFF | ON | ON | OFF | OFF | OFF |

FIG.10

| GRADATION LEVEL | S51 | S52 | S53 | S54 | S61 | S62 | S63 | S64 |
|---|---|---|---|---|---|---|---|---|
| 0 | OFF | OFF | OFF | ON | OFF | OFF | OFF | ON |
| 1 | OFF | ON | ON | OFF | ON | ON | OFF | OFF |
| 2 | ON | ON | OFF | OFF | ON | OFF | OFF | ON |
| 3 | OFF | ON | ON | OFF | ON | OFF | OFF | ON |
| −1 | OFF | ON | ON | OFF | ON | ON | OFF | OFF |
| −2 | ON | ON | OFF | OFF | OFF | ON | ON | OFF |
| −3 | ON | OFF | OFF | ON | OFF | ON | ON | OFF |

FIG.17

| GRADATION LEVEL | SW0 | SW1 | SW2 | SW3 | SW4 | SW5 | SW6 | SW7 | APPLIED VOLTAGE |
|---|---|---|---|---|---|---|---|---|---|
| 0 | OFF | ON | OFF | ON | OFF | OFF | OFF | OFF | 0V |
| 1 | ON | OFF | OFF | OFF | OFF | OFF | ON | OFF | 24.5V (=E1−E2) |
| 2 | OFF | OFF | OFF | ON | OFF | ON | OFF | OFF | 50V (=E2) |
| 3 | ON | OFF | OFF | ON | OFF | OFF | OFF | OFF | 74.5V (=E1) |

FIG.21

| GRADATION LEVEL | S11 | S12 | S3 | S4 | S21 | S22 | S31 | S32 |
|---|---|---|---|---|---|---|---|---|
| 0 | OFF | OFF | ON | ON | OFF | OFF | OFF | OFF |
| 1 | OFF | OFF | OFF | OFF | ON | OFF | OFF | ON |
| 2 | ON | OFF | OFF | OFF | OFF | ON | OFF | OFF |
| 3 | ON | OFF | OFF | OFF | OFF | OFF | OFF | ON |
| 4 | OFF | OFF | OFF | ON | OFF | OFF | ON | OFF |
| 5 | OFF | OFF | OFF | ON | ON | OFF | OFF | OFF |
| 6 | ON | OFF | OFF | ON | OFF | OFF | OFF | OFF |
| −1 | OFF | OFF | OFF | OFF | OFF | ON | ON | OFF |
| −2 | OFF | ON | OFF | OFF | ON | OFF | OFF | OFF |
| −3 | OFF | ON | OFF | OFF | OFF | OFF | ON | OFF |
| −4 | OFF | OFF | ON | OFF | OFF | OFF | OFF | ON |
| −5 | OFF | OFF | ON | OFF | OFF | ON | OFF | OFF |
| −6 | OFF | ON | ON | OFF | OFF | OFF | OFF | OFF |

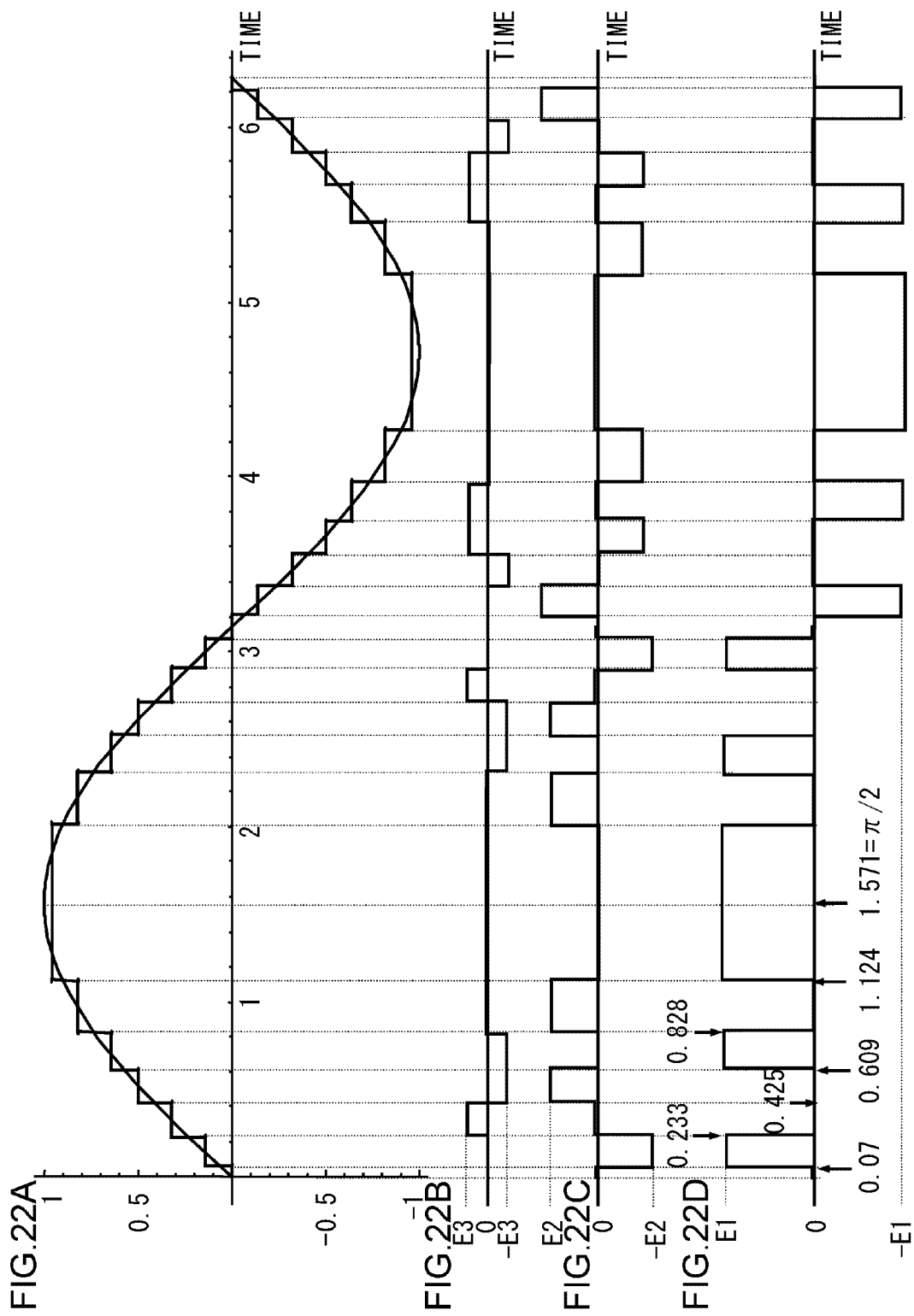

FIG.24

| GRADATION LEVEL | SW0 | SW1 | SW2 | SW3 | SW4 | SW5 | SW6 | SW7 | SW8 | SW9 | SW10 | SW11 | APPLIED VOLTAGE |
|---|---|---|---|---|---|---|---|---|---|---|---|---|---|
| 0 | OFF | ON | OFF | ON | OFF | OFF | OFF | OFF | OFF | OFF | OFF | OFF | 0V |
| 1 | ON | OFF | OFF | OFF | OFF | OFF | ON | OFF | OFF | OFF | OFF | OFF | 14V (=E1−E2) |
| 2 | OFF | OFF | OFF | ON | OFF | OFF | OFF | OFF | OFF | ON | OFF | OFF | 32V (=E3) |
| 3 | OFF | OFF | OFF | OFF | OFF | ON | OFF | OFF | OFF | OFF | ON | OFF | 50V (=E2−E3) |
| 4 | ON | OFF | OFF | ON | OFF | ON | OFF | OFF | OFF | OFF | ON | OFF | 64V (=E1−E3) |
| 5 | OFF | OFF | OFF | ON | OFF | OFF | OFF | OFF | OFF | OFF | OFF | OFF | 82V (=E2) |
| 6 | ON | OFF | OFF | ON | OFF | OFF | OFF | OFF | OFF | OFF | OFF | OFF | 96V (=E1) |

103c

INVERTER AND POWER CONVERTER HAVING INVERTER MOUNTED THEREIN

RELATED APPLICATIONS

This application is the U.S. National Phase under 35 U.S.C. §371 of International Application No. PCT/JP2010/064803, filed on Aug. 31, 2010, which in turn claims the benefit of Japanese Application Nos. 2009-200450 filed on Aug. 31, 2009 and 2010-042970 filed Feb. 26, 2010, the disclosures of which Applications are incorporated by reference herein.

FIELD OF THE INVENTION

The present invention relates to an inverter, which converts direct-current power to alternating-current power, and a power convertor having the same mounted therein.

DESCRIPTION OF THE RELATED ART

Recently, a solar power generation system rapidly becomes popular. In the solar power generation system, it is required to install a power conditioner for efficiently using power generated by a solar cell module. The power conditioner has an inverter mounted therein for converting direct-current power to alternating-current power. In order to obtain more power by the solar power generation system, improvement in energy conversion efficiency by a solar cell and improvement in power conversion efficiency by the power conditioner are important. In order to realize the latter, the inverter with small power loss is required.

Recently, a gradationally controlled inverter capable of making switching loss smaller than that of the conventional PWM inverter is developed to be put to practical use (for example, refer to the patent literature 1). The gradationally controlled inverter is composed of a plurality of inverters having binary or ternary voltage relationship for generating a pseudo sine wave by combining output voltages of the inverters.

CITATION LIST

Patent Literature

Patent Literature 1: Japanese Patent Application Laid-Open No. 2004-7941

DISCLOSURE OF THE INVENTION

Problems to be Solved by the Invention

Under such a condition, the inventors of the present invention finds the inverter capable of further making the switching loss smaller than that of the above-described gradationally controlled inverter. The present invention is achieved in consideration of such a condition and an object thereof is to provide technology to improve the power conversion efficiency of the inverter.

Means for Solving the Problems

In order to solve the above-described problem, the inverter according to one embodiment of the present invention is the inverter, which converts the direct-current power from a plurality of direct-current power supplies with different voltages to alternating-current power, provided with a control unit, which generates the pseudo sine wave. The control unit generates the pseudo sine wave by using power-supply voltages from the direct-current power supplies and potential difference between two power-supply voltages.

Effect of the Invention

According to the present invention, it is possible to improve the power conversion efficiency of the inverter.

BRIEF DESCRIPTION OF THE DRAWINGS

FIG. 5 is a view illustrating an on/off state of a switch when the inverter according to the first embodiment generates seven types of gradation levels;

FIG. 10 is a view illustrating an on/off state of a switch when the inverter according to the comparative example generates seven types of gradation levels;

FIG. 17 is a view illustrating the on/off state of the switch when the inverter illustrated in FIG. 16 generates four types of gradation levels;

FIG. 21 is a view illustrating the on/off state of the switch when the inverter according to the second embodiment generates 13 types of gradation levels;

FIG. 22A is a view illustrating the pseudo sine wave generated by using the power-supply voltage E1, the power-supply voltage E2, and the power-supply voltage E3 of which ratio is set to the optimal ratio, FIG. 22B is a view illustrating a voltage to be supplied from the third direct-current power supply V3 to the load, FIG. 22C is a view illustrating the voltage to be supplied from the second direct-current power supply V2 to the load, and FIG. 22D is a view illustrating the voltage to be supplied from the first direct-current power supply V1 to the load;

FIG. 24 is a view illustrating the on/off state of the switch when the inverter illustrated in FIG. 23 generates the seven types of gradation levels;

FIG. 27A illustrates time axis data; and FIG. 27B illustrates frequency axis data;

FIG. 28A illustrates the time axis data; and FIG. 28B illustrates the frequency axis data;

BEST MODE FOR CARRYING OUT THE INVENTION

First Embodiment

Figure 1:
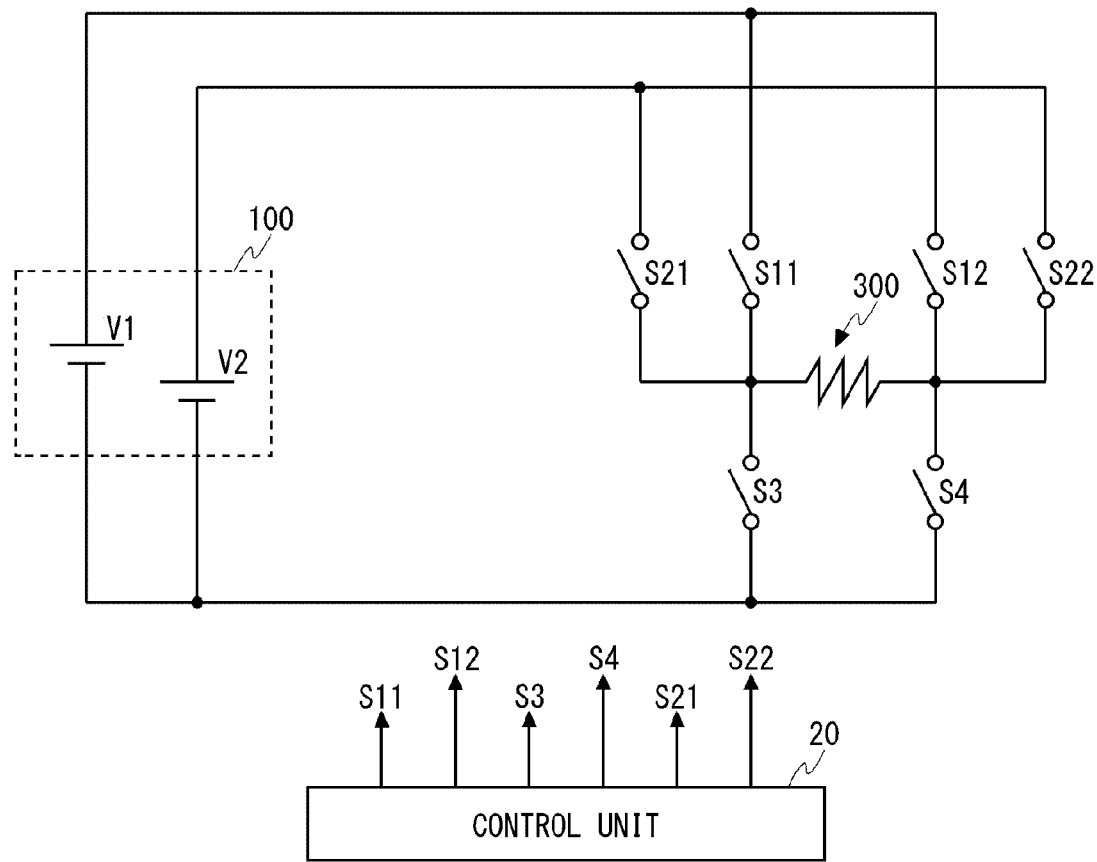
FIG. 1 is a view illustrating a circuit configuration of an inverter according to a first embodiment of the present invention.

FIG. 1 is a view illustrating a circuit configuration of an inverter 200 according to a first embodiment of the present invention. Meanwhile, although a direct-current power supply unit 100 and a load 300 are also indicated in FIG. 1 for convenience of description, the direct-current power supply unit 100 and the load 300 are not components of the inverter 200. The inverter 200 converts direct-current power from a plurality of direct-current power supplies included in the direct-current power supply unit 100 to alternating-current power. The direct-current power supply unit 100 includes a first direct-current power supply V1 and a second direct-current power supply V2 having different power-supply voltages. The inverter 200 is provided with a plurality of H bridge circuits and a control unit 20. The control unit 20 generates a pseudo sine wave by using the power-supply voltages from the direct-current power supplies and a differential voltage between the two power-supply voltages (hereinafter, also referred to as "potential difference").

A plurality of H bridge circuits are provided for a plurality of direct-current power supplies having different voltages for supplying a forward voltage and a backward voltage from each of the plurality of direct-current power supplies to the load 300. The control unit 20 generates the pseudo sine wave by controlling a plurality of H bridge circuits.

Hereinafter, this is described more specifically. In the first embodiment, since two types of direct-current power supplies (first direct-current power supply V1 and second direct-current power supply V2) are provided, two H bridge circuits are provided in the inverter 200 according to the first embodiment. Also, it is supposed to be designed such that relationship of a power-supply voltage E1 of the first direct-current power supply V1>a power-supply voltage E2 of the second direct-current power supply V2 is satisfied in the first embodiment.

The first H bridge circuit is the circuit for supplying the forward voltage and the backward voltage from the first direct-current power supply V1 to the load 300 and is provided with a 1-1 switch S11, a 1-2 switch S12, a first common switch S3, and a second common switch S4. The 1-1 switch S11 and the 1-2 switch S12 are provided in parallel between a high potential side of the first direct-current power supply V1 and the load 300. The first common switch S3 and the second common switch S4 are provided in parallel between a low potential side of the first direct-current power supply V1 and the load 300.

More specifically, the 1-1 switch S11 is inserted into a path, which connects a high-potential-side terminal of the first direct-current power supply V1 and a high-potential-side terminal of the load 300, and the 1-2 switch S12 is inserted into a path, which connects the high-potential-side terminal of the first direct-current power supply V1 and a low-potential-side terminal of the load 300. The first common switch S3 is inserted into a path, which connects a low-potential-side terminal of the first direct-current power supply V1 and the high-potential-side terminal of the load 300, and the second common switch S4 is inserted into a path, which connects the low-potential-side terminal of the first direct-current power supply V1 and the low-potential-side terminal of the load 300.

In the first H bridge circuit, the 1-1 switch S11 and the second common switch S4 are turned on and the 1-2 switch S12 and the first common switch S3 are turned off by the control unit 20 when the forward voltage is applied from the first direct-current power supply V1 to the load 300. On the other hand, when the backward voltage is applied from the first direct-current power supply V1 to the load 300, it is controlled such that the 1-1 switch S11 and the second common switch S4 are turned off and the 1-2 switch S12 and the first common switch S3 are turned on.

The second H bridge circuit is the circuit for supplying the forward voltage and the backward voltage from the second direct-current power supply V2 to the load 300 and is provided with a 2-1 switch S21, a 2-2 switch S22, the first common switch S3, and the second common switch S4. The 2-1 switch S21 and the 2-2 switch S22 are provided in parallel between a high potential side of the second direct-current power supply V2 and the load 300. The first common switch S3 and the second common switch S4 are provided in parallel between a low potential side of the second direct-current power supply V2 and the load 300.

In this manner, the first common switch S3 and the second common switch S4, which compose the first H bridge circuit, and the first common switch S3 and the second common switch S4, which compose the second H bridge circuit, are the same in the first embodiment. That is to say, two low-potential-side paths, which form the first H bridge circuit, and two low-potential-side paths, which form the second H bridge circuit, are the same.

In the first embodiment, a low-potential-side voltage of the first direct-current power supply V1 and a low-potential-side voltage of the second direct-current power supply V2 are set at a common predetermined fixed voltage (for example, ground voltage), thereby it is possible to share a wiring as wirings on low-potential sides of both of them. According to this, it is possible to decrease the number of switches included in the inverter 200.

Detailed connection relationship and on/off operation of the 2-1 switch S21, the 2-2 switch S22, the first common switch S3, and the second common switch S4 included in the second H bridge circuit are similar to those of the 1-1 switch S11, the 1-2 switch S12, the first common switch S3, and the second common switch S4 included in the first H bridge circuit, so that the description thereof is omitted.

A power metal-oxide-semiconductor field-effect transistor (MOSFET) or an insulated gate bipolar transistor (IGBT) may be adopted as each of the 1-1 switch S11, the 1-2 switch S12, the 2-1 switch S21, the 2-2 switch S22, the first common switch S3, and the second common switch S4.

In the first embodiment, the control unit 20 generates the pseudo sine wave by controlling the first H bridge circuit and the second H bridge circuit. More specifically, this performs time-division switching of the voltage to be supplied to the load 300 by controlling the first H bridge circuit and the second H bridge circuit. The larger the number of voltages (also referred to as number of gradations in this specification) is, the smoother the sine wave to be generated is.

The inverter 200, which uses the two direct-current power supplies and the two H bridge circuits, may generate positive and negative four types of voltages (E1, E2, −E2, and −E1). It is possible to generate five types of voltages if a null voltage of a state in which the voltage is not supplied to the load 300 is added. In the first embodiment, other two types of voltages are generated without increasing the number of direct-current power supplies and the H bridge circuits. Therefore, a total of seven types of voltages are generated.

A method of generating other two types of voltages is hereinafter described. The control unit 20 disables the two low-potential-side paths, which form the first H bridge circuit, and disables the two low-potential-side paths, which form the second H bridge circuit. That is to say, the control unit 20 controls to turn off the first common switch S3 and the second common switch S4. Also, this enables two high-potential-side paths, which form the first H bridge circuit, and two high-potential-side paths, which form the second H bridge circuit. According to this, another H bridge circuit (hereinafter, represented as a 1 and 2 H bridge circuit) is formed. That is to say, the 1 and 2 H bridge circuit is the circuit obtained by combining a high-potential-side half of the first H bridge circuit and a high-potential-side half of the second H bridge circuit.

The 1 and 2 H bridge circuit is the circuit for supplying the potential difference between the first direct-current power supply V1 and the second direct-current power supply V2 to the load 300 in the forward direction and the backward direction and includes the 1-1 switch S11, the 1-2 switch S12, the 2-1 switch S21, and the 2-2 switch S22.

Figure 2:
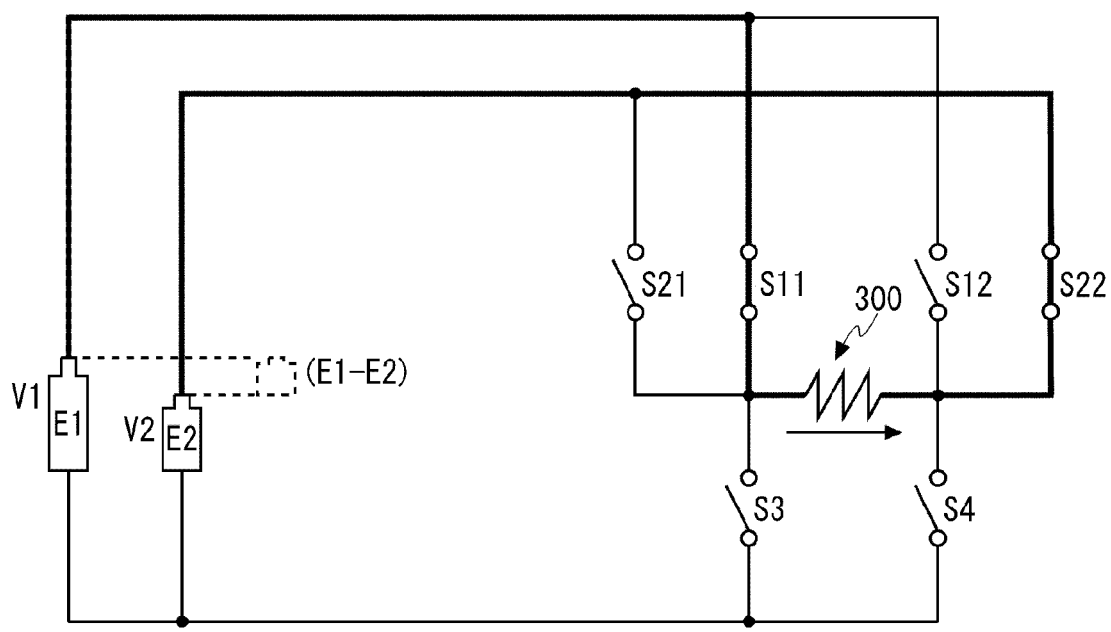
FIG. 2 is a view illustrating a state in which a forward voltage is supplied to a load by a 1 and 2 bridge circuit.
Figure 3:
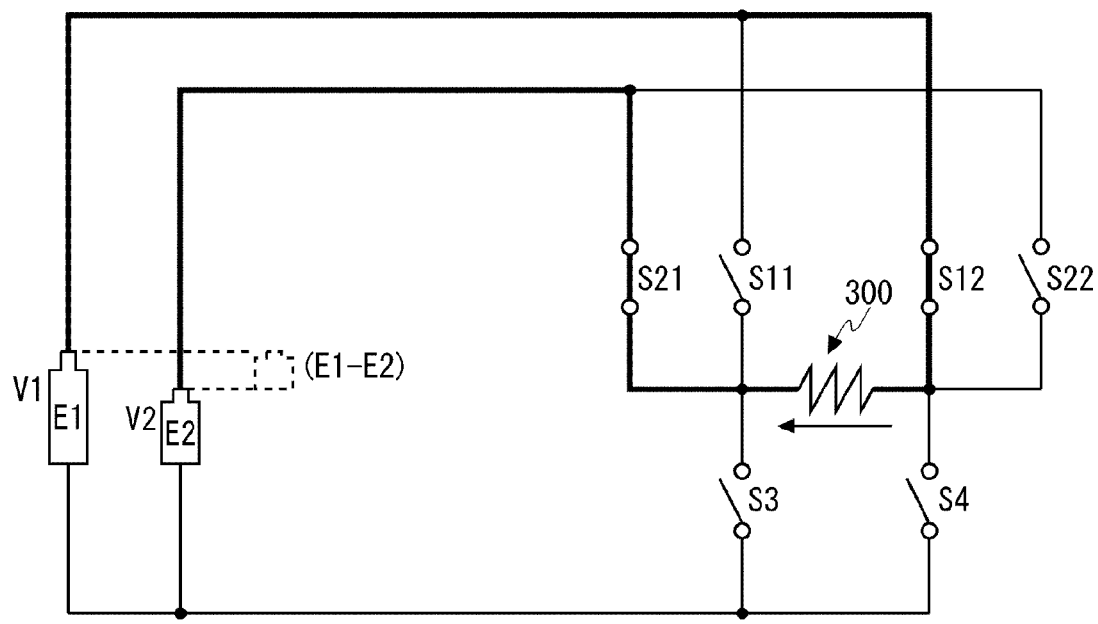
FIG. 3 is a view illustrating a state in which a backward voltage is supplied to the load by the 1 and 2 H bridge circuit.

FIG. 2 illustrates a state in which the forward voltage is supplied to the load 300 by the 1 and 2 H bridge circuit. FIG. 3 illustrates a state in which the backward voltage is supplied to the load 300 by the 1 and 2 H bridge circuit. In FIGS. 2 and 3, a path indicated by a thick line is the path through which a current flows.

In FIG. 2, the control unit 20 may supply the potential difference between the first direct-current power supply V1 and the second direct-current power supply V2 (E1−E2) to the load 300 in the forward direction by controlling to turn on the 1-1 switch S11 and the 2-2 switch S22 and to turn off the 1-2 switch S12, the 2-1 switch S21, the first common switch S3, and the second common switch S4.

In FIG. 3, the control unit 20 may supply the potential difference between the first direct-current power supply V1 and the second direct-current power supply V2 (E1−E2) to the load 300 in the backward direction by controlling to turn on the 1-2 switch S12 and the 2-1 switch S21 and to turn off the 1-1 switch S11, the 2-2 switch S22, the first common switch S3, and the second common switch S4.

As described above, the control unit 20 generates the seven types of voltages by using the power-supply voltage E1 from the first direct-current power supply V1, the power-supply voltage E2 from the second direct-current power supply V2, and the potential difference between the power-supply voltage E1 and the power-supply voltage E2 (E1−E2) to generate the pseudo sine wave.

Figure 4:
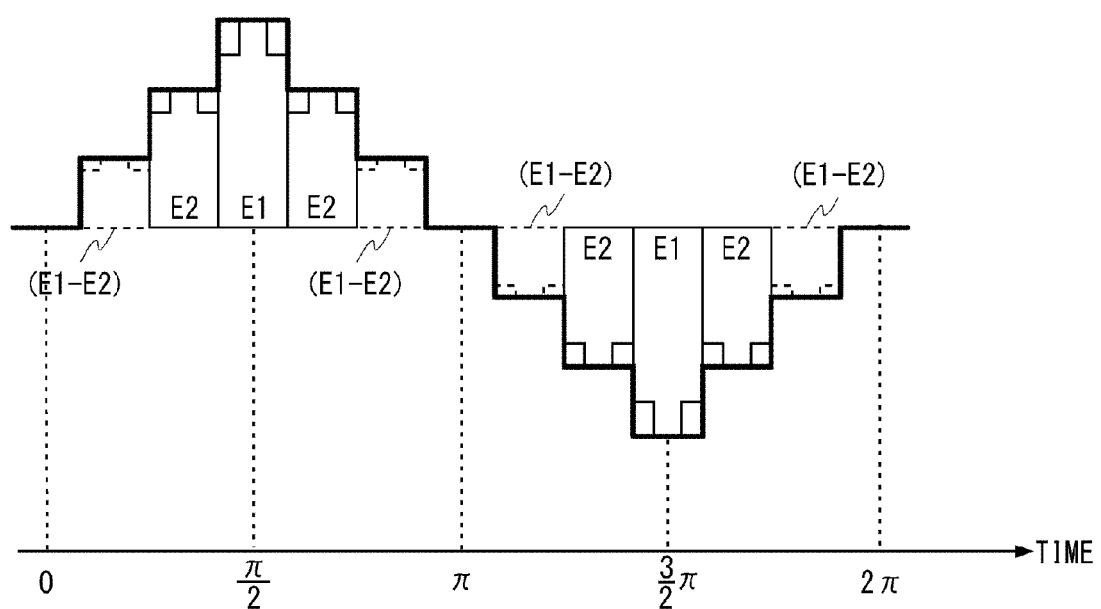
FIG. 4 is a view illustrating a pseudo sine wave generated by the inverter according to the first embodiment.

FIG. 4 is a view illustrating the pseudo sine wave generated by the inverter 200 according to the first embodiment. As described above, the seven types of voltages may be generated in the first embodiment. The control unit 20 generates the pseudo sine wave by switching the voltage to be supplied to the load 300 in the order of the null voltage, the above-described potential difference (E1−E2) (positive), the voltage E2 of the second direct-current power supply V2 (positive), the voltage E1 of the first direct-current power supply V1 (positive), the voltage E2 of the second direct-current power supply V2 (positive), the above-described potential difference (E1−E2) (positive), the null voltage, the above-described potential difference (E1−E2) (negative), the voltage E2 of the second direct-current power supply V2 (negative), the voltage E1 of the first direct-current power supply V1 (negative), the voltage E2 of the second direct-current power supply V2 (negative), the above-described potential difference (E1−E2) (negative), and the null voltage.

In this manner, the control unit 20 changes an output voltage in the order of the null voltage, the potential difference (E1−E2), the voltage E2, and the voltage E1 during a period from a phase 0 to a phase π/2 of an alternating-current output, that is to say, a 1/4 cycle. Subsequently, the control unit 20 changes the output voltage in the order of the voltage E1, the voltage E2, the potential difference (E1−E2), and the null voltage during a period from the phase π/2 to a phase π of the alternating-current output. Subsequently, the control unit 20 changes the output voltage in the order of the null voltage, the potential difference (E2−E1), the voltage (−E2), and the voltage (−E1) during a period from the phase π to a phase (3/2) π of the alternating-current output. Subsequently, the control unit 20 changes the output voltage in the order of the voltage (−E1), the voltage (−E2), a voltage (E2−E1), and the null voltage during a period from the phase (3/2)π to a phase 2π of the alternating-current output. In this manner, the control unit 20 generates the pseudo sine wave.

For example, when a ratio of the voltage E1 of the first direct-current power supply V1 to the voltage E2 of the second direct-current power supply V2 is set to 3:2, it is possible to set the ratio of the voltage E1 of the first direct-current power supply V1 to the voltage E2 of the second direct-current power supply V2 to the above-described potential difference (E1−E2) to 3:2:1. In this manner, it is possible to generate a smoother pseudo sine wave by making difference between the gradation levels the same or decreasing the difference.

FIG. 5 is a view illustrating the on/off state of the switch when the inverter 200 according to the first embodiment generates the seven types of gradation levels. Gradation levels 0, 1, 2, 3, −1, −2, and −3 correspond to the above-described null voltage, the above-described potential difference (E1−E2) (positive), the voltage E2 of the second direct-current power supply V2 (positive), the voltage E1 of the first direct-current power supply V1 (positive), the above-described potential difference (E1−E2) (negative), the voltage E2 of the second direct-current power supply V2 (negative), and the voltage E1 of the first direct-current power supply V1 (negative), respectively. The control unit 20 controls to turn on/off the 1-1 witch S11, the 1-2 switch S12, the first common switch S3, the second common switch S4, the 2-1 switch S21, and the 2-2 switch S22 as illustrated in FIG. 5.

With reference to FIG. 1 again, in the first embodiment, the current flows through the 2-1 switch S21 and the 2-2 switch S22 in both directions. Therefore, it is required to adopt bidirectional switching elements as the 2-1 switch S21 and the 2-2 switch S22. For example, bidirectional power MOS-FET or IGBT are used. Alternatively, it is possible to compose one bidirectional switching element by arranging two unidirectional power MOSFETs or IGBTs in series or in parallel.

The current flows through the 1-1 switch S11, the 1-2 switch S12, the first common switch S3, and the second common switch S4 only in one direction. Therefore, it is possible to adopt general unidirectional switching elements as the 1-1 switch S11, the 1-2 switch S12, the first common switch S3, and the second common switch S4.

The switch through which the current flows in two directions corresponds to the switch inserted into each of two low-potential-side paths, which form the 1 and 2 H bridge circuit (that is to say, the switch inserted into each of the two high-potential-side paths, which form the second H bridge circuit). That is to say, the direction of the current flowing through the 2-1 switch S21 and the 2-2 switch S22 inserted into the two paths, which connect the second direct-current power supply V2 of which voltage is low out of the first direct-current power supply V1 and the second direct-current power supply V2 and the load 300, is different according to a case in which the second H bridge circuit is formed and in which the 1 and 2 H bridge circuit is formed.

Comparative Example

Figure 6:
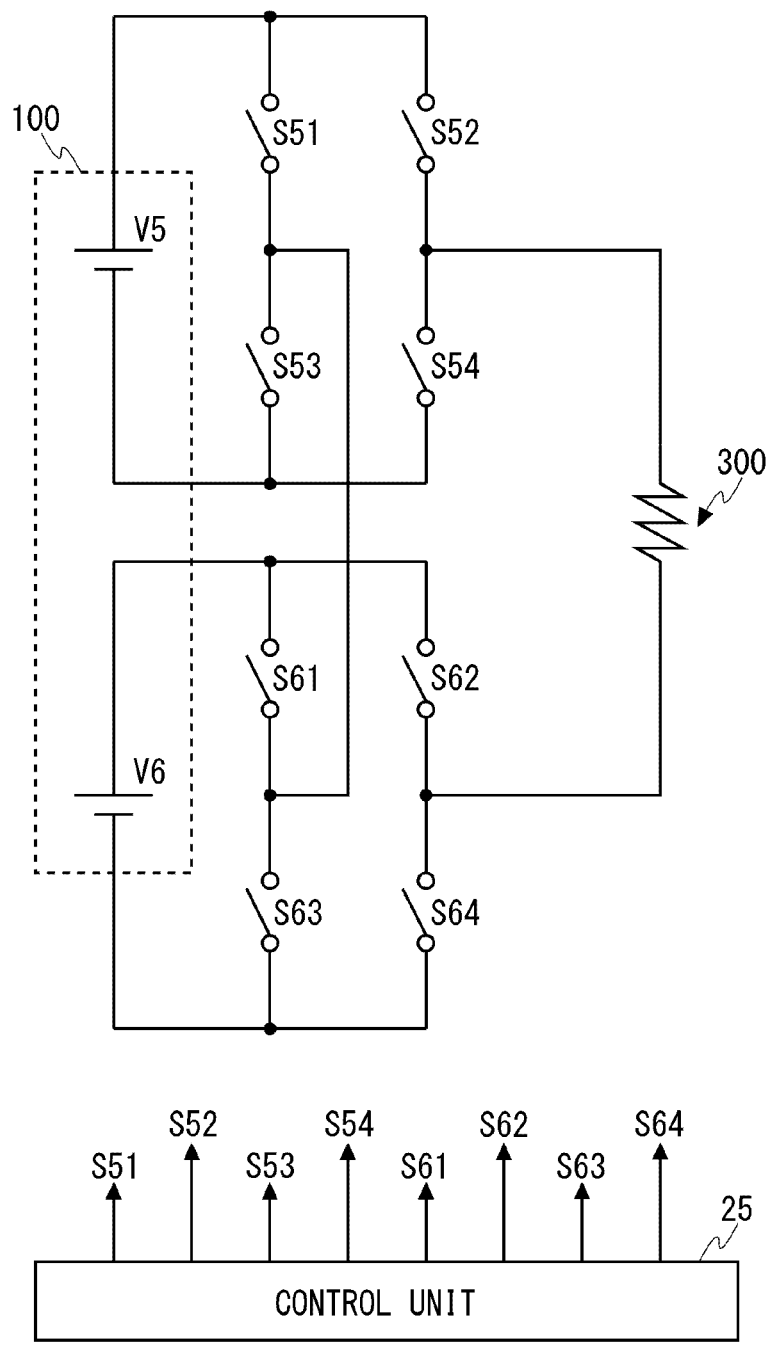
FIG. 6 is a view illustrating a circuit configuration of an inverter according to a comparative example, which should be compared to the first embodiment of the present invention.

FIG. 6 is a view illustrating a circuit configuration of an inverter 250 according to a comparative example, which should be compared to the first embodiment of the present invention. Although a direct-current power supply unit 100 and a load 300 are also indicated in FIG. 6 for convenience of description, the direct-current power supply unit 100 and the load 300 are not components of the inverter 250.

The inverter 250 is provided with a plurality of switches and a control unit 25. A 5-1 switch S51, a 5-2 switch S52, a 5-3 switch S53, and a 5-4 switch S54 are provided between a fifth direct-current power supply V5 and the load 300. A 6-1 switch S61, a 6-2 switch S62, a 6-3 switch S63, and a 6-4 switch S64 are provided between a sixth direct-current power supply V6 and the load 300. Meanwhile, it is supposed to be designed such that relationship of a voltage E5 of the fifth direct-current power supply V5>a voltage E6 of the sixth direct-current power supply V6 is satisfied in the comparative example.

The 5-1 switch S51 and the 5-3 switch S53 form a first series circuit and both terminals of the first series circuit are connected to both terminals of the fifth direct-current power supply V5. The 5-2 switch S52 and the 5-4 switch S54 form a second series circuit and both terminals of the second series circuit are connected to the both terminals of the fifth direct-current power supply V5 in parallel with the first series circuit.

The 6-1 switch S61 and the 6-3 switch S63 form a third series circuit and both terminals of the third series circuit are connected to both terminals of the sixth direct-current power supply V6. The 6-2 switch S62 and the 6-4 switch S64 form a fourth series circuit and both terminals of the fourth series circuit are connected to the both terminals of the sixth direct-current power supply V6 in parallel with the third series circuit.

A midpoint of the first series circuit and a midpoint of the third series circuit are connected to each other, a midpoint of the second series circuit and a high-potential-side terminal of the load 300 are connected to each other, and a midpoint of the fourth series circuit and a low-potential-side terminal of the load 300 are connected to each other.

In the comparative example, the control unit 25 generates a pseudo sine wave by controlling the 5-1 switch S51, the 5-2 switch S52, the 5-3 switch S53, the 5-4 switch S54, the 6-1 switch S61, the 6-2 switch S62, the 6-3 switch S63, and the 6-4 switch S64.

The inverter 250 may generate positive and negative four types of voltages from two direct-current power supplies. It is possible to generate five types of voltages if a null voltage of a state in which the voltage is not supplied to the load 300 is added. In the comparative example, other two types of voltages are generated by making a state in which the fifth direct-current power supply V5 and the sixth direct-current power supply V6 are connected in series. Therefore, a total of seven types of voltages are generated.

Figure 7:
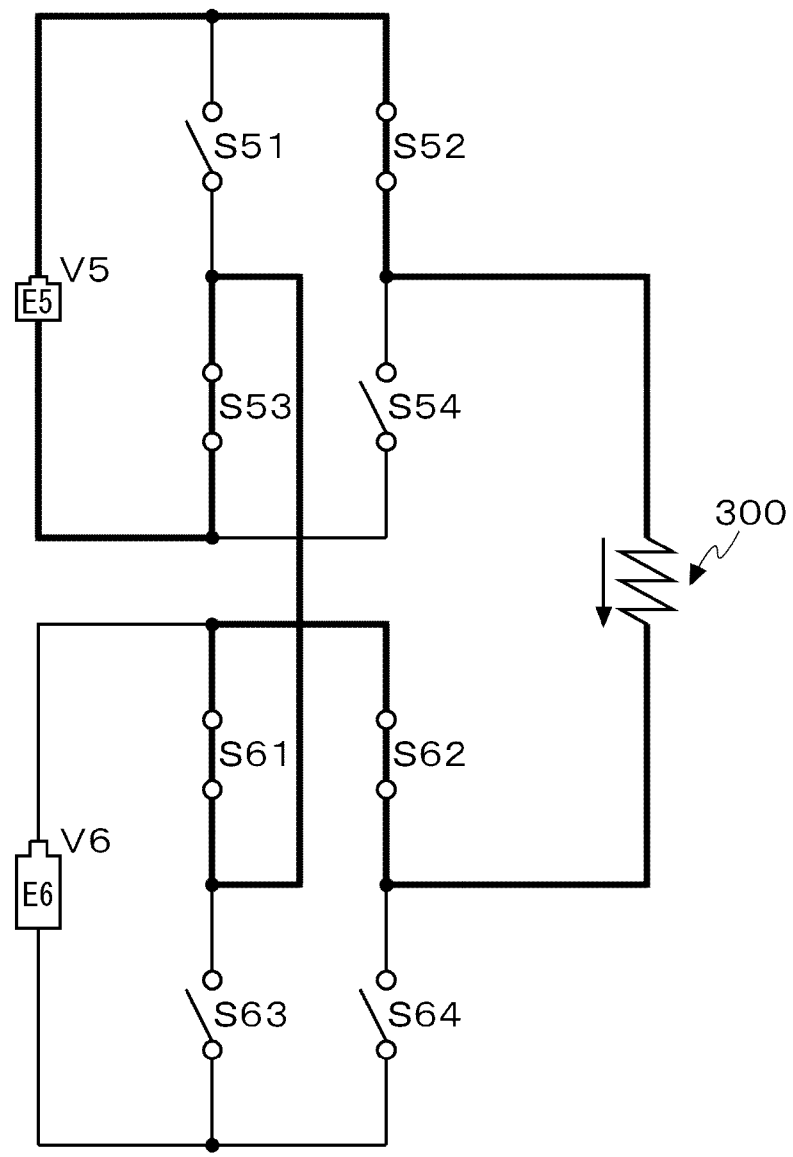
FIG. 7 is a view illustrating a state in which the forward voltage is supplied from a fifth direct-current power supply V5 to the load.
Figure 8:
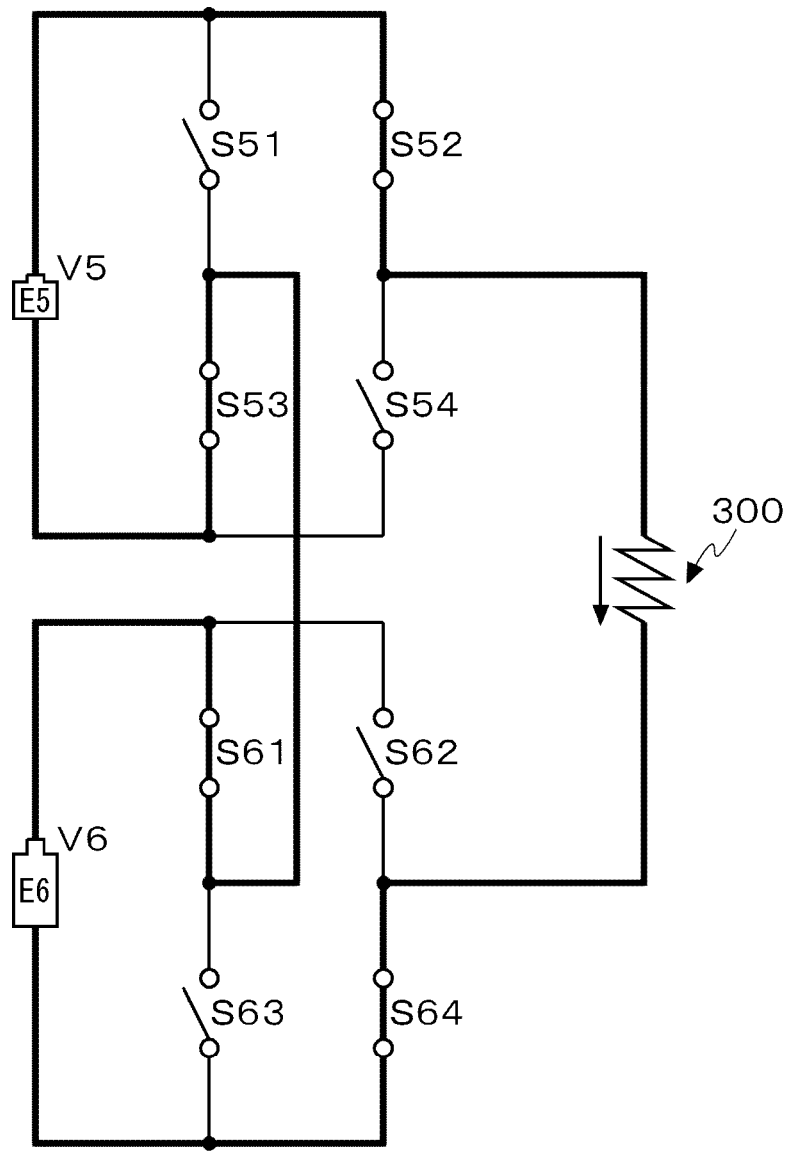
FIG. 8 is a view illustrating a state in which the forward voltage is supplied from the fifth direct-current power supply V5 and a sixth direct-current power supply V6 connected in series to the load.

FIG. 7 illustrates a state in which a forward voltage is supplied from the fifth direct-current power supply V5 to the load 300. FIG. 8 illustrates a state in which the forward voltage is supplied from the fifth direct-current power supply V5 and the sixth direct-current power supply V6 connected in series to the load 300. In FIGS. 7 and 8, a path indicated by a thick line is the path through which a current flows.

In FIG. 7, the control unit 25 may supply the forward voltage from the fifth direct-current power supply V5 to the load 300 by controlling to turn on the 5-2 switch S52, the 5-3 switch S53, the 6-1 switch S61, and the 6-2 switch S62 and to turn off the 5-1 switch S51, the 5-4 switch S54, the 6-3 switch S63, and the 6-4 switch S64.

In FIG. 8, the control unit 25 may supply the forward voltage from the fifth direct-current power supply V5 and the sixth direct-current power supply V6 connected in series to the load 300 by controlling to turn on the 5-2 switch S52, the 5-3 switch S53, the 6-1 switch S61, and the 6-4 switch S64 and to turn off the 5-1 switch S51, the 5-4 switch S54, the 6-2 switch S62, and the 6-3 switch S63.

Figure 9:
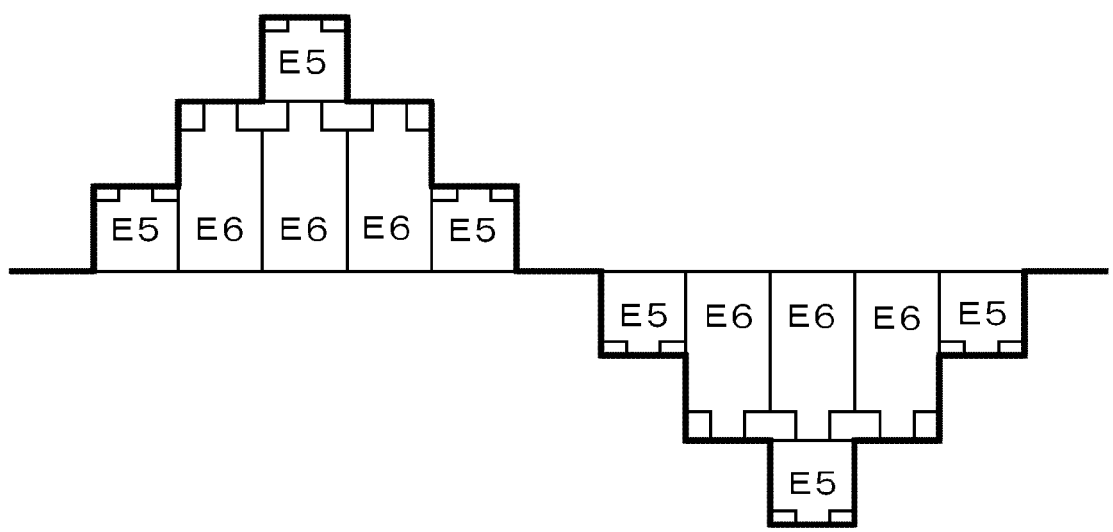
FIG. 9 is a view illustrating a pseudo sine wave generated by the inverter according to the comparative example.

FIG. 9 is a view illustrating the pseudo sine wave generated by the inverter 250 according to the comparative example. As described above, it is possible to generate the seven types of voltages also in the comparative example. The control unit 25 generates the pseudo sine wave by switching the voltage to be supplied to the load 300 in the order of the null voltage, the voltage E5 of the fifth direct-current power supply V5 (positive), the voltage E6 of the sixth direct-current power supply V6 (positive), a resultant voltage of the fifth direct-current power supply V5 and the sixth direct-current power supply V6 connected in series (positive), the voltage E6 of the sixth direct-current power supply V6 (positive), the voltage E5 of the fifth direct-current power supply V5 (positive), the null voltage, the voltage E5 of the fifth direct-current power supply V5 (negative), the voltage E6 of the sixth direct-current power supply V6 (negative), the resultant voltage of the fifth direct-current power supply V5 and the sixth direct-current power supply V6 connected in series (negative), the voltage E6 of the sixth direct-current power supply V6 (negative), and the voltage E5 of the fifth direct-current power supply V5 (negative).

FIG. 10 is a view illustrating an on/off state of the switch when the inverter 250 according to the comparative example generates the seven types of gradation levels. Gradation levels 0, 1, 2, 3, −1, −2, and −3 correspond to the above-described null voltage, the voltage E5 of the fifth direct-current power supply V5 (positive), the voltage E6 of the sixth direct-current power supply V6 (positive), the resultant voltage of the fifth direct-current power supply V5 and the sixth direct-current power supply V6 connected in series (positive), the voltage E5 of the fifth direct-current power supply V5 (negative), the voltage E6 of the sixth direct-current power supply V6 (negative), and the resultant voltage of the fifth direct-current power supply V5 and the sixth direct-current power supply V6 connected in series (negative), respectively. The control unit 25 controls to turn on/off the 5-1 witch S51, the 5-2 switch S52, the 5-3 switch S53, the 5-4 switch S54, the 6-1 switch S61, the 6-2 switch S62, the 6-3 switch S63, and the 6-4 switch S64 as illustrated in FIG. 10.

The inverter 200 according to the first embodiment illustrated in FIG. 1 and the inverter 250 according to the comparative example illustrated in FIG. 6 are hereinafter compared to each other. The number of switches is six in the former and eight in the latter. Also, the number of switches through which the current passes in each closed loop is always two in the former and always four in the latter. Also, low potential sides of the two direct-current power supplies of the former are the same and the two direct-current power supplies are separated from each other in the latter. Also, the voltage of the gradation level 1 generated by the two direct-current power supplies is potential difference between the first direct-current power supply V1 and the second direct-current power supply V2 in the former and the fifth direct-current power supply V5 in the latter.

Hereinafter, an effect of the first embodiment of the present invention is described based on this. According to the first embodiment, it is possible to improve power conversion efficiency of the inverter. That is to say, since the pseudo sine wave is generated by gradation control, it is possible to decrease the number of times of switching as compared to a conventional PWM system and it is possible to decrease switching loss. Also, it is possible to obtain a smooth alternating-current output waveform without necessity of a large-scale output filter.

Also, according to the first embodiment, it is possible to decrease the number of switches through which the current passes in each closed loop as compared to the comparative example. Therefore, it is possible to further decrease power loss. Also, it is possible to decrease the number of switches as compared to the comparative example, thereby realizing a smaller circuit scale and a lower cost.

Also, since a circuit configuration in which the two direct-current power supplies are connected in series is used in the comparative example, it is not possible to share the low-potential side (for example, ground) of the two direct-current power supplies. For example, a plurality of independent direct-current power supplies are realized by using a transformer provided with one primary winding and a plurality of secondary windings. On the other hand, it is possible to share the low-potential side (for example, ground) of the two direct-current power supplies in the first embodiment. Therefore, it is possible to simplify the circuit configuration and to realize the smaller circuit scale. It goes without saying that it is not necessary to provide the above-described transformer.

In the above-described example, according to a policy to generate the smooth pseudo sine wave by making difference between the gradation levels the same or decreasing the difference, a ratio of the power-supply voltage E1 of the first direct-current power supply V1 to the power-supply voltage E2 of the second direct-current power supply V2 is set to 3:2. In the first embodiment, it is possible to generate three types of voltages (E1−E2, E2, and E1) in a positive region. In order to generate a smoother pseudo sine wave, the inventor of the present invention studies about the ratio of the power-supply voltage E1 to the power-supply voltage E2. As described above, "E1>E2" is satisfied.

Figure 11A:
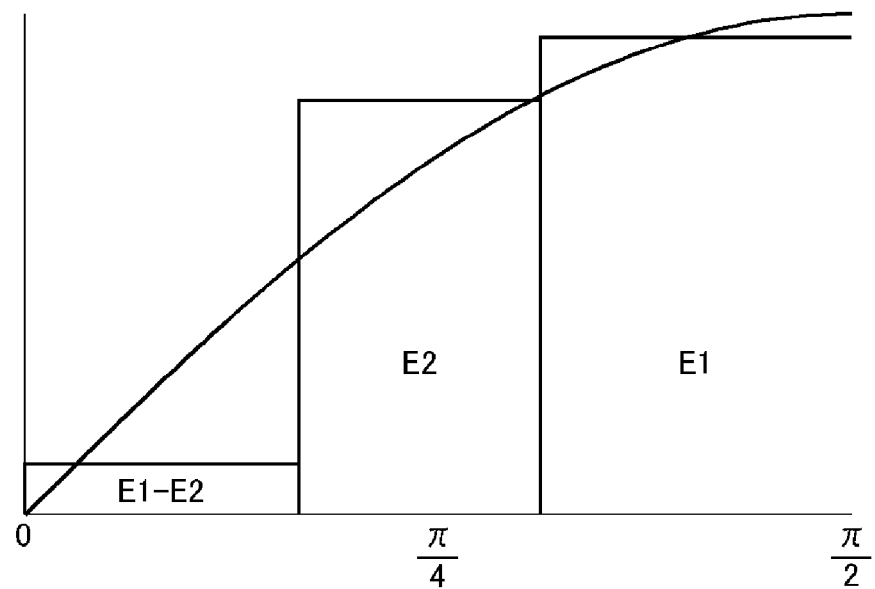
FIG. 11A is a view illustrating a staircase waveform when values of a power-supply voltage E1 and a power-supply voltage E2 are close to each other.
Figure 11B:
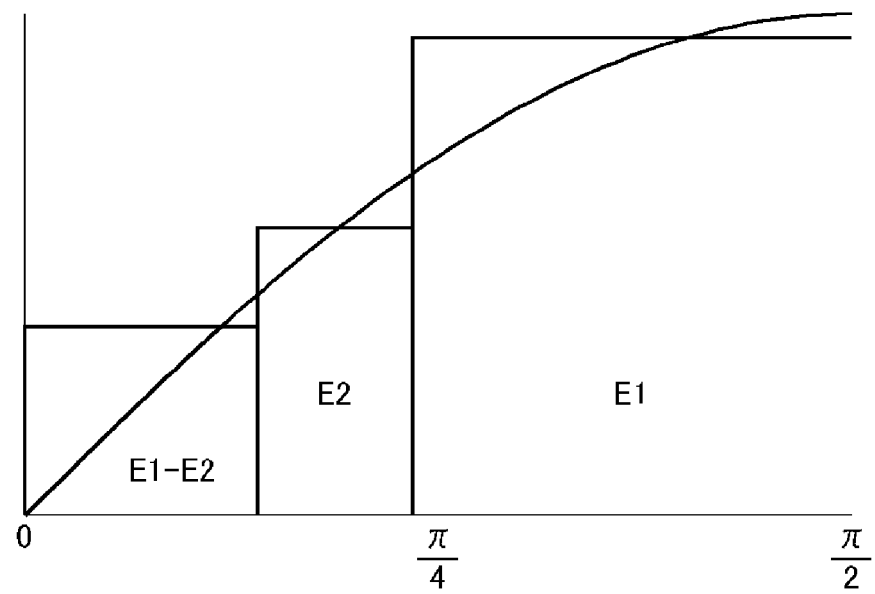
FIG. 11B is a view illustrating the staircase waveform when the values of the power-supply voltage E1 and the power-supply voltage E2 are far from each other.

FIG. 11 illustrates the gradation level formed according to a set ratio of the power-supply voltage E1 to the power-supply voltage E2. FIG. 11A illustrates a staircase waveform when values of the power-supply voltage E1 and the power-supply voltage E2 are close to each other, and FIG. 11B illustrates the staircase waveform when the values of the power-supply voltage E1 and the power-supply voltage E2 are far from each other. As illustrated in FIG. 11A, when the power-supply voltage E1 and the power-supply voltage E2 are too close to each other, a shift amount from the sine wave increases during the period from the phase 0 to the phase $\pi/4$. On the other hand, as illustrated in FIG. 11B, when the power-supply voltage E1 and the power-supply voltage E2 are too far from each other, the shift amount from the sine wave increases during the period from the phase $\pi/4$ to the phase $\pi/2$. From above, it is preferable to optimize the ratio of the power-supply voltage E1 to the power-supply voltage E2 in order to efficiently utilize the differential voltage (E1−E2).

Figure 12A:
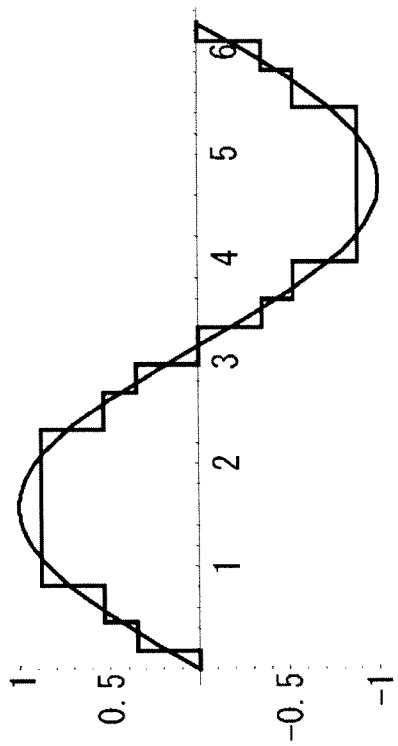
FIG. 12A is a view illustrating the staircase waveform when a ratio of the power-supply voltage E1 to the power-supply voltage E2 is set to 10:9.
Figure 12B:
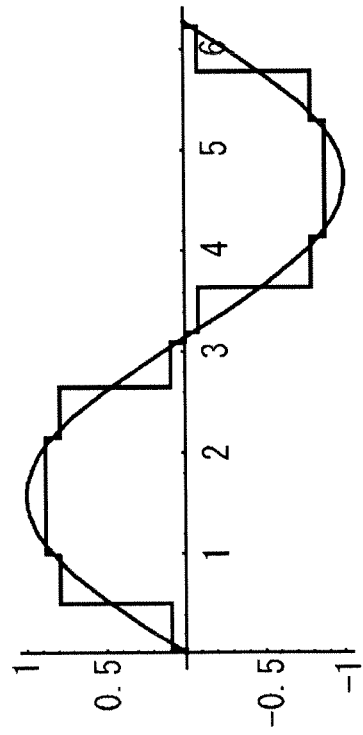
FIG. 12B is a view illustrating the staircase waveform when the ratio of the power-supply voltage E1 to the power-supply voltage E2 is set to 10:6.

FIG. 12A illustrates the staircase waveform when the ratio of the power-supply voltage E1 to the power-supply voltage E2 is set to 10:9, and FIG. 12B illustrates the staircase waveform when the ratio of the power-supply voltage E1 to the power-supply voltage E2 is set to 10:6. During the period from the phase 0 to the phase $\pi/2$, the shift amount from the sine wave is large during the period from the phase 0 to the phase $\pi/4$ in the staircase waveform illustrated in FIG. 12A. On the other hand, the shift amount from the sine wave is large during the period from the phase $\pi/4$ to the phase $\pi/2$ in the staircase waveform illustrated in FIG. 12B. Hereinafter, an optimal ratio between the power-supply voltages is derived in order to decrease the shift amount from the sine wave.

Figure 13:
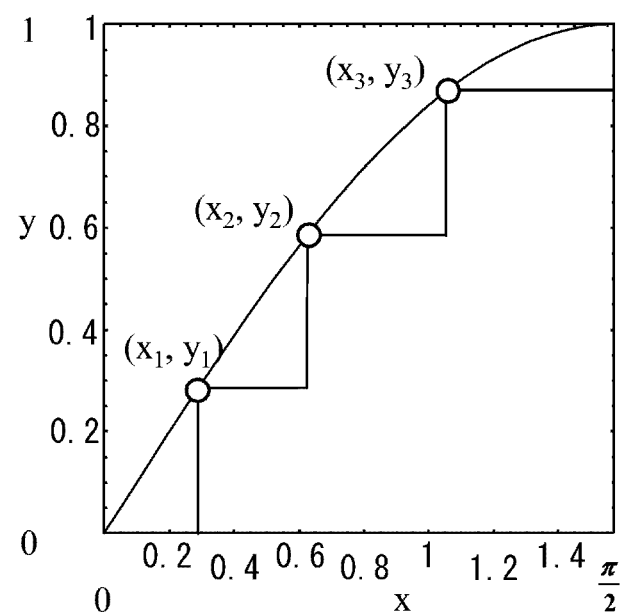
FIG. 13 is a view for illustrating a method of searching an optimal ratio.

FIG. 13 is a view for illustrating a method of searching the optimal ratio. Herein, an optimal solution is searched in a 1/4 cycle from the phase 0 to the phase $\pi/2$ of the sine wave. In the first embodiment, the three types of voltages (E1−E2, E2, and E1) are generated in the positive region, so that in the method of searching, three points are plotted on sin(x) and combination of the three points with which an area S1 enclosed by the sine wave, an x axis (y=0), and x=$\pi/2$ and an area S2 enclosed by the staircase waveform by the plotted three points, the x axis (y=0), and x=$\pi/2$ are the closest is searched. Meanwhile, as illustrated, the staircase waveform is on an inner side of the sine wave, so that "area S1>area S2" is always satisfied. Therefore, a process to bring the area S2 closer to the area S1 is also performed by appropriately correcting each point after the combination of the three points are searched.

Two values Y1 and Y2 are first selected within a range of $0 \le y \le 1$. Next, selected Y1 and Y2 and |Y1−Y2| are arranged in the order of volume and corresponding x values are obtained.

[Expression 1]

minimum value middle value maximum value (1)

The area S2 under the staircase waveform is obtained.

[Expression 2]

$$S2 = y_1(x_2 - x_1) + y_2(x_3 - x_2) + y_3\left(\frac{\pi}{2} - x_3\right)$$
$$= y_1(\sin^{-1}(y_2) - \sin^{-1}(y_1)) + y_2(\sin^{-1}(y_3) - \sin^{-1}(y_2)) +$$
$$y_3\left(\frac{\pi}{2} - \sin^{-1}(y_3)\right)$$ (2)

Next, difference between the area S1 and the area S2 is obtained. Meanwhile, the area S1 is set to 1.

[Expression 3]

$$E(Y1, Y2) = 1 - y_1(\sin^{-1}(y_2) - \sin^{-1}(y_1)) -$$
$$y_2(\sin^{-1}(y_3) - \sin^{-1}(y_2)) - y_3\left(\frac{\pi}{2} - \sin^{-1}(y_3)\right)$$ (3)

That is to say, the search of the optimal solution results in a problem to obtain (Y1,Y2), which minimizes E(Y1,Y2) of the expression 3. By solving this, $(x_1,y_1)=(0.289,0.285)$ $(x_2,y_2)=(0.625,0.585)$ $(x_3,y_3)=(1.055,0.870)$ are obtained.

Since the staircase waveform in FIG. 13 is on the inner side of the sine wave, $x_1$, $x_2$, and $x_3$ are corrected by a following expression 4 in order to bring the area S2 closer to the area S1:

[Expression 4]

$$x_3 \leftarrow \frac{x_3 - x_2}{2}, x_2 \leftarrow \frac{x_2 - x_1}{2}, x_1 \leftarrow \frac{x_1}{2}$$ (4)

From the expression 4, $(x_1,y_1)=(0.145,0.285)$ $(x_2,y_2)=(0.457,0.585)$ $(x_3,y_3)=(0.840,0.870)$ are obtained. According to this, the staircase waveform is shifted to left.

Figure 14:
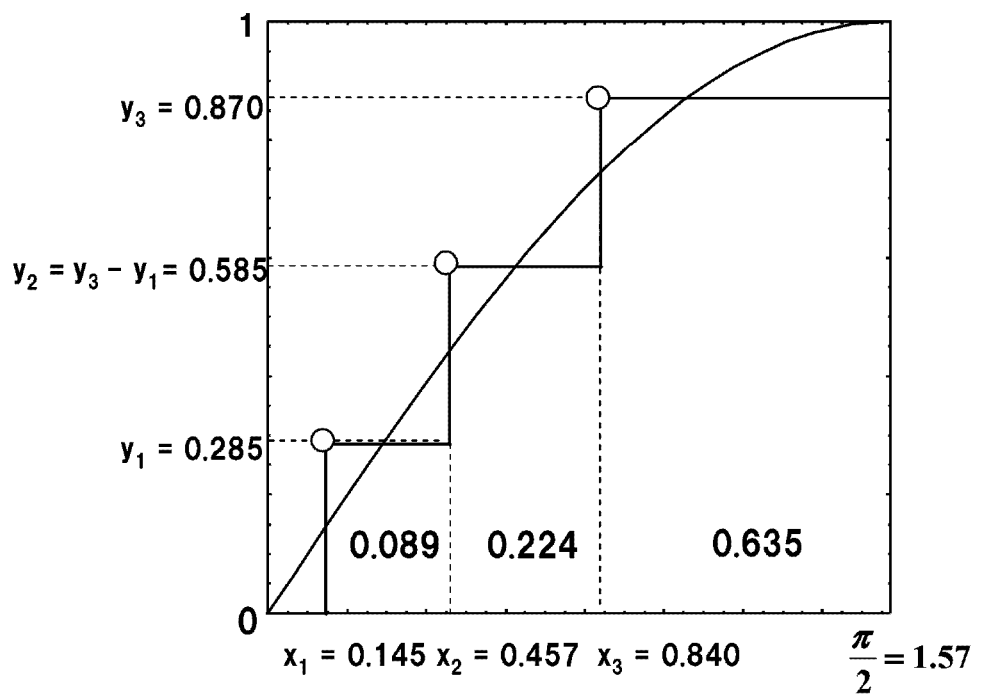
FIG. 14 is a view illustrating a corrected staircase waveform.

FIG. 14 illustrates a corrected staircase waveform. The area S2 under the staircase waveform is set to 0.948, which is a value significantly close to the area S1 (=1) of the sine wave. By the above-described search, the optimal ratio "power-supply voltage E1:power-supply voltage E2=0.870:0.585" may be derived. That is to say, E1:E2=1.49:1.

Then, by setting the ratio of the power-supply voltage E1 to the power-supply voltage E2 to the derived optimal ratio, the inverter 200 of this embodiment may generate the smoother pseudo sine wave.

Figure 15:
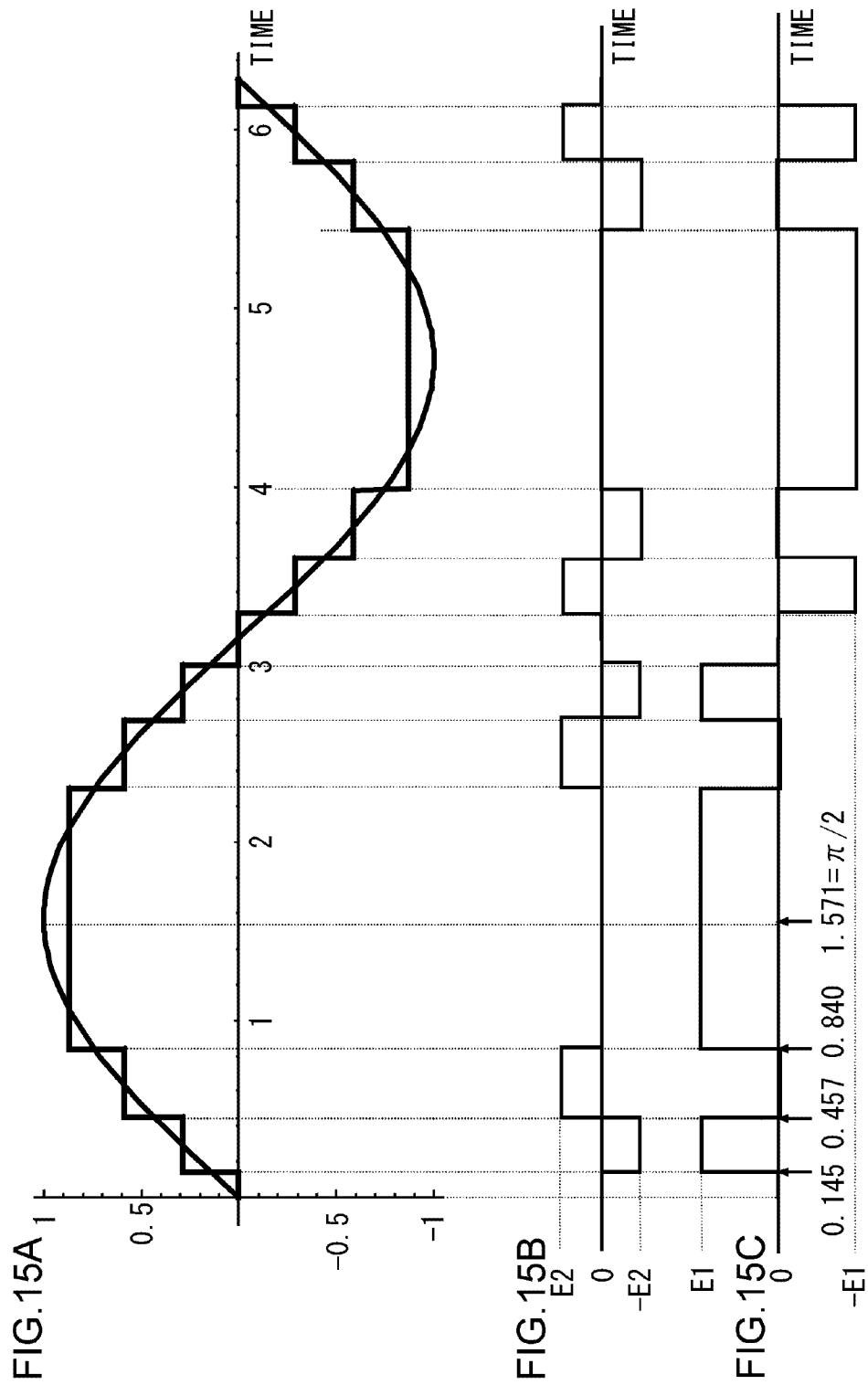
FIG. 15A is a view illustrating the pseudo sine wave generated by using the power-supply voltage E1 and the power-supply voltage E2 of which ratio is set to the optimal ratio.
FIG. 15B is a view illustrating a voltage to be supplied from the second direct-current power supply V2 to the load.
FIG. 15C is a view illustrating the voltage to be supplied from the first direct-current power supply V1 to the load.

FIG. 15A illustrates the pseudo sine wave generated by using the power-supply voltage E1 and the power-supply voltage E2 of which ratio is set to the optimal ratio. FIG. 15B illustrates the voltage to be supplied from the second direct-current power supply V2 to the load 300 and FIG. 15C illustrates the voltage to be supplied from the first direct-current power supply V1 to the load 300. The control unit 20 controls the first H bridge circuit and the second H bridge circuit at timings $x_1$, $x_2$, and $x_3$ derived from the expression 4 to switch the voltage to be supplied to the load 300, so that it becomes possible to generate the smooth pseudo sine wave illustrated in FIG. 15A.

Figure 16:
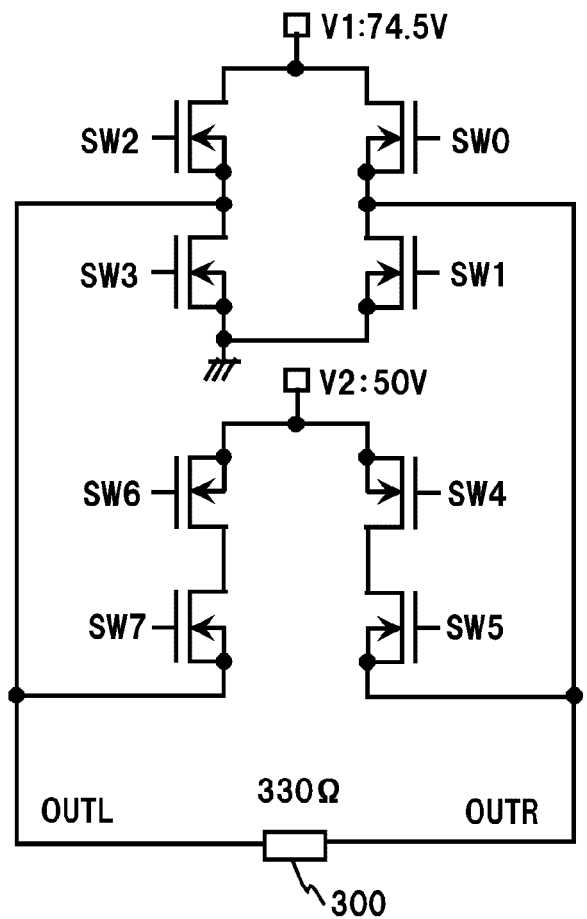
FIG. 16 is a view illustrating an implementation circuit of the inverter according to the first embodiment.

FIG. 16 illustrates an implementation circuit of the inverter 200 according to the first embodiment. The power-supply voltage E1 of the first direct-current power supply V1 is set to 74.5 V and the power-supply voltage E2 of the second direct-current power supply V2 is set to 50 V, thereby realizing the optimal ratio of both of them. As compared to FIG. 1, in FIG. 16, the 1-1 switch S11 corresponds to a switch SW0, the 1-2 switch S12 corresponds to a switch SW2, the first common switch S3 corresponds to a switch SW1, the second common switch S4 corresponds to a switch SW3, the 2-1 switch S21 corresponds to switches SW4 and SW5, and the 2-2 switch S22 corresponds to switches SW6 and SW7, respectively. Meanwhile, although a direction from left to right is set to the forward direction in FIG. 1, a direction from right to left is set to the forward direction in FIG. 16 for convenience of the description.

FIG. 17 is a view illustrating the on/off state of the switch when the inverter 200 illustrated in FIG. 16 generates the four types of gradation levels. The gradation levels 0, 1, 2, and 3 correspond to the null voltage, the potential difference (E1−E2) (positive), the voltage E2 of the second direct-current power supply V2 (positive), and the voltage E1 of the first direct-current power supply V1 (positive), respectively. The control unit 20 controls to turn on/off the switches SW0 to SW7 as illustrated in FIG. 17.

Meanwhile, a parasitic diode is present between a source and a drain of each switch SW (power MOSFET). In FIG. 17, the switch SW7 when generating the gradation level 1 and the switch SW4 when generating the gradation level 2 are turned off, this is because the current flows through the parasitic diode. Meanwhile, although it is possible to turn on the switches SW, it is preferable to turn off the same to allow the current to flow through the parasitic diode in order to reduce switching loss.

Second Embodiment

Figure 18:
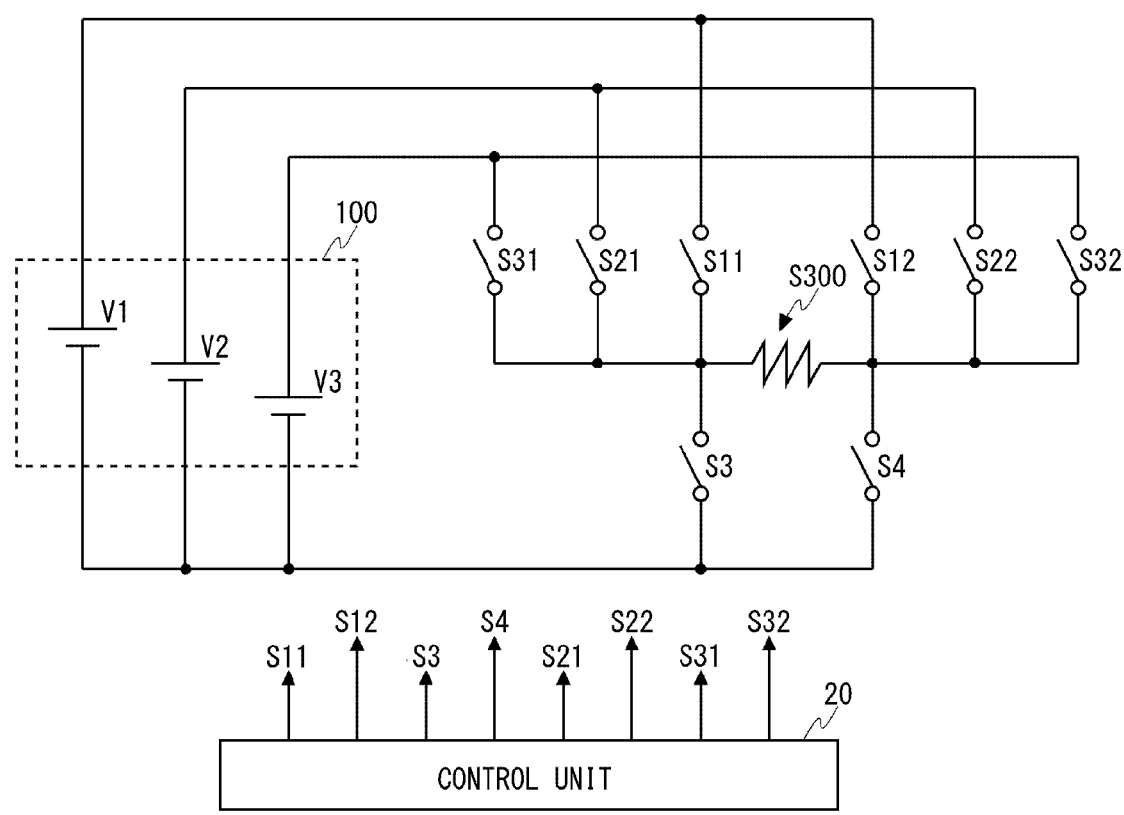
FIG. 18 is a view illustrating a circuit configuration of an inverter according to a second embodiment of the present invention.

FIG. 18 is a view illustrating a circuit configuration of an inverter 200 according to a second embodiment of the present invention. The inverter 200 converts direct-current power from a plurality of direct-current power supplies included in a direct-current power supply unit 100 to alternating-current power. The direct-current power supply unit 100 includes a first direct-current power supply V1, a second direct-current power supply V2, and a third direct-current power supply V3 having different power-supply voltages. The inverter 200 is provided with a plurality of H bridge circuits and a control unit 20. The control unit 20 generates a pseudo sine wave by using the power-supply voltages from the direct-current power supplies and potential difference between two power-supply voltages. Three H bridge circuits are provided on the inverter 200 according to the second embodiment. Also, it is supposed to be designed such that relationship of a power-supply voltage E1 of the first direct-current power supply V1>a power-supply voltage E2 of the second direct-current power supply V2>a power-supply voltage E3 of the third direct-current power supply V3 is satisfied in the second embodiment.

A configuration of each of the first H bridge circuit and the second H bridge circuit is similar to that of the first embodiment. The third H bridge circuit is the circuit for supplying a forward voltage and a backward voltage from the third direct-current power supply V3 to a load 300 and is provided with a 3-1 switch S31, a 3-2 switch S32, a first common switch S3, and a second common switch S4. The 3-1 switch S31 and the 3-2 switch S32 are provided in parallel between a high potential side of the third direct-current power supply V3 and the load 300. The first common switch S3 and the second common switch S4 are provided in parallel between a low potential side of the third direct-current power supply V3 and the load 300.

Detailed connection relationship and on/off operation of the 3-1 switch S31, the 3-2 switch S32, the first common switch S3, and the second common switch S4 included in the third H bridge circuit are similar to those of a 1-1 switch S11, a 1-2 switch S12, the first common switch S3, and the second common switch S4 included in the first H bridge circuit, so that the description thereof is omitted.

It is possible to adopt a power MOSFET or an IGBT also as each of the 3-1 switch S31 and the 3-2 switch S32. A current also flows through the 3-1 switch S31 and the 3-2 switch S32 in both directions. Therefore, a bidirectional switching element is adopted as each of the 3-1 switch S31 and the 3-2 switch S32.

In the second embodiment, the control unit 20 generates the pseudo sine wave by controlling the first H bridge circuit, the second H bridge circuit, and the third H bridge circuit. More specifically, this performs time-division switching of the voltage to be supplied to the load 300 by controlling the first H bridge circuit, the second H bridge circuit, and the third H bridge circuit. The larger the number of voltages is, the smoother the sine wave to be generated is.

The inverter 200, which uses the three direct-current power supplies and the three H bridge circuits, may generate positive and negative six types of voltages (E1, E2, E3, −E3, −E2, and −E1). It is possible to generate seven types of voltages if a null voltage of a state in which the voltage is not supplied to the load 300 is added. In the second embodiment, other six types of voltages are generated without increasing the number of direct-current power supplies and H bridge circuits. Therefore, a total of 13 types of voltages are generated.

A method of generating other six types of voltages is hereinafter described. The control unit 20 enables two high-potential-side paths, which form the first H bridge circuit, and two high-potential-side paths, which form the second H bridge circuit, and disables two low-potential-side paths, which form the first H bridge circuit, two low-potential-side paths, which form the second H bridge circuit, and all the paths of the third H bridge circuit, thereby forming a 1 and 2 H bridge circuit. That is to say, the 1 and 2 H bridge circuit is the circuit obtained by combining a high-potential-side half of the first H bridge circuit and a high-potential-side half of the second H bridge circuit.

The 1 and 2 H bridge circuit is the circuit, which supplies the potential difference between the first direct-current power supply V1 and the second direct-current power supply V2 to the load 300 in a forward direction and a backward direction, and includes the 1-1 switch S11, the 1-2 switch S12, a 2-1 switch S21, and a 2-2 switch S22.

Also, the control unit 20 enables the two high-potential-side paths, which form the first H bridge circuit, and two high-potential side paths, which form the third H bridge circuit, and disables the two low-potential-side paths, which form the first H bridge circuit, two low-potential-side paths, which form the third H bridge circuit, and all the paths of the second H bridge circuit, thereby forming a 1 and 3 H bridge circuit. That is to say, the 1 and 3 H bridge circuit is the circuit obtained by combining the high-potential-side half of the first H bridge circuit and a high-potential-side half of the third H bridge circuit.

The 1 and 3 H bridge circuit is the circuit, which supplies the potential difference between the first direct-current power supply V1 and the third direct-current power supply V3 to the load 300 in the forward direction and the backward direction, and includes the 1-1 switch S11, the 1-2 switch S12, the 3-1 switch S31, and the 3-2 switch S32.

Also, the control unit 20 enables the two high-potential-side paths, which form the second H bridge circuit, and the two high-potential-side paths, which form the third H bridge circuit, and disables the two low-potential-side paths, which form the second H bridge circuit, the two low-potential-side paths, which form the third H bridge circuit, and all the paths of the first H bridge circuit, thereby forming a 2 and 3 H bridge circuit. That is to say, the 2 and 3 H bridge circuit is the circuit obtained by combining the high-potential-side half of the second H bridge circuit and the high-potential-side half of the third H bridge circuit.

The 2 and 3 H bridge circuit is the circuit, which supplies the potential difference between the second direct-current power supply V2 and the third direct-current power supply V3 to the load 300 in the forward direction and the backward direction, and includes the 2-1 switch S21, the 2-2 switch S22, the 3-1 switch S31, and the 3-2 switch S32.

Figure 19:
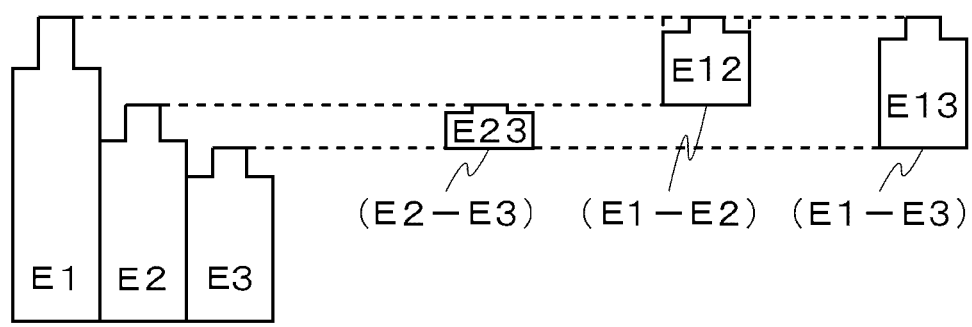
FIG. 19 is a view illustrating relationship of the voltage E1 of the first direct-current power supply V1, the voltage E2 of the second direct-current power supply V2, a voltage E3 of a third direct-current power supply V3, first potential difference between the voltage E1 of the first direct-current power supply V1 and the voltage E2 of the second direct-current power supply V2 (E1–E2), second potential difference between the voltage E1 of the first direct-current power supply V1 and the voltage E3 of the third direct-current power supply V3 (E1–E3), and third potential difference between the voltage E2 of the second direct-current power supply V2 and the voltage E3 of the third direct-current power supply V3 (E2–E3)

FIG. 19 is a view illustrating relationship among the voltage E1 of the first direct-current power supply V1, the voltage E2 of the second direct-current power supply V2, the voltage E3 of the third direct-current power supply V3, first potential difference between the voltage E1 of the first direct-current power supply V1 and the voltage E2 of the second direct-current power supply V2 (E1−E2), second potential difference between the voltage E1 of the first direct-current power supply V1 and the voltage E3 of the third direct-current power supply V3 (E1−E3), and third potential difference between the voltage E2 of the second direct-current power supply V2 and the voltage E3 of the third direct-current power supply V3 (E2−E3).

FIG. 19 illustrates an example in which a ratio of the voltage E1 of the first direct-current power supply V1 to voltage E2 of the second direct-current power supply V2 to the voltage E3 of the third direct-current power supply V3 is set to 7:5:4. In this case, the ratio of the first potential difference (E1−E2) to the second potential difference (E1−E3) to the third potential difference (E2−E3) is set to 2:3:1. As a whole, the ratio of the voltage E1 of the first direct-current power supply V1 to the voltage E2 of the second direct-current power supply V2 to the voltage E3 of the third direct-current power supply V3 to the second potential difference (E1−E3 to the first potential difference (E1−E2) to the third potential difference (E2−E3) is set to 7:5:4:3:2:1.

Figure 20:
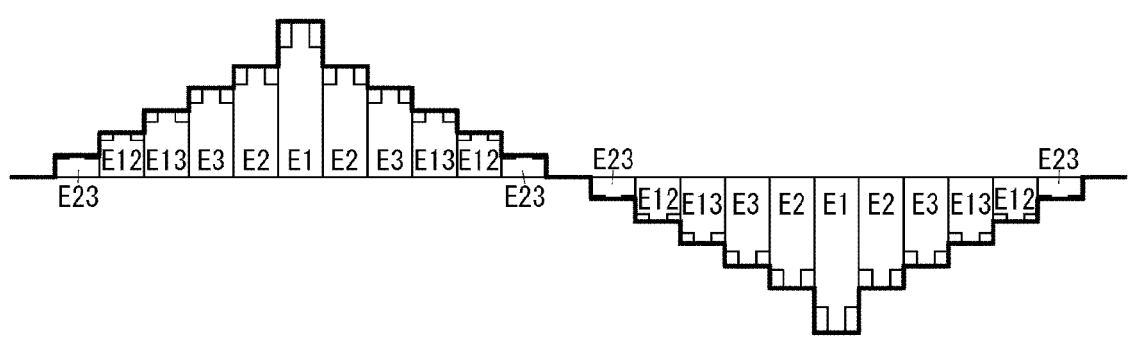
FIG. 20 is a view illustrating the pseudo sine wave generated by the inverter according to the second embodiment.

FIG. 20 is a view illustrating the pseudo sine wave generated by the inverter 200 according to the second embodiment. As described above, the 13 types of voltages may be generated in the second embodiment. The control unit 20 generates the pseudo sine wave by switching the voltage to be supplied to the load 300 in the order of the null voltage, the above-described third potential difference (E2−E3) (positive), the above-described first potential difference (E1−E2) (positive), the above-described second potential difference (E1−E3) (positive), the voltage E3 of the third direct-current power supply V3 (positive), the voltage E2 of the second direct-current power supply V2 (positive), the voltage E1 of the first direct-current power supply V1 (positive), the voltage E2 of the second direct-current power supply V2 (positive), the voltage E3 of the third direct-current power supply V3 (positive), the above-described second potential difference (E1−E3) (positive), the above-described first potential difference (E1−E2) (positive), the above-described third potential difference (E2−E3) (positive), the null voltage, the above-described third potential difference (E2−E3) (negative), the above-described first potential difference (E1−E2) (negative), the above-described second potential difference (E1−E3) (negative), the voltage E3 of the third direct-current power supply V3 (negative), the voltage E2 of the second direct-current power supply V2 (negative), the voltage E1 of the first direct-current power supply V1 (negative), the voltage E2 of the second direct-current power supply V2 (negative), the voltage E3 of the third direct-current power supply V3 (negative), the above-described second potential difference (E1−E3) (negative), the above-described first potential difference (E1−E2) (negative), the above-described third potential difference (E2−E3) (negative), and the null voltage. In this manner, it is possible to generate a smoother pseudo sine wave by increasing the number of gradations.

As described above, the control unit 20 generates the 13 types of voltages by using the power-supply voltage E1 from the first direct-current power supply V1, the power-supply voltage E2 from the second direct-current power supply V2, the power-supply voltage E3 from the third direct-current power supply V3, the first potential difference between the power-supply voltage E1 and the power-supply voltage E2 (E1−E2), the second potential difference between the power-supply voltage E1 and the power-supply voltage E3 (E1−E3), and the third potential difference between the power-supply voltage E2 and the power-supply voltage E3 (E2−E3), thereby generating the pseudo sine wave.

FIG. 21 is a view illustrating an on/off state of the switch when the inverter 200 according to the second embodiment generates the 13 types of gradation levels. The gradation levels 0, 1, 2, 3, 4, 5, 6, −1, −2, −3, −4, −5, and −6 correspond to the above-described null voltage, the above-described third potential difference (E2−E3) (positive), the above-described first potential difference (E1−E2) (positive), the above-described second potential difference (E1−E3) (positive), the voltage E3 of the third direct-current power supply V3 (positive), the voltage E2 of the second direct-current power supply V2 (positive), the voltage E1 of the first direct-current power supply V1 (positive), the above-described third potential difference (E2−E3) (negative), the above-described first potential difference (E1−E2) (negative), the above-described second potential difference (E1−E3) (negative), the voltage E3 of the third direct-current power supply V3 (negative), the voltage E2 of the second direct-current power supply V2 (negative), and the voltage E1 of the first direct-current power supply V1 (negative), respectively. The control unit 20 controls to turn on/off the 1-1 switch S11, the 1-2 switch S12, the first common switch S3, the second common switch S4, the 2-1 switch S21, the 2-2 switch S22, the 3-1 switch S31, and the 3-2 switch S32 as illustrated in FIG. 21.

As described above, according to the second embodiment of the present invention, it is possible to generate the smoother sine wave than that of the first embodiment. That is to say, the inverter 200 according to the second embodiment may increase the number of gradations by six as compared to the inverter 200 according to the first embodiment by adding the third direct-current power supply V3 and the third H bridge circuit to the inverter 200 according to the first embodiment.

In the above-described example, according to a policy to generate the smooth pseudo sine wave by making difference between the gradation levels the same or decreasing the difference, the ratio of the power-supply voltage E1 of the first direct-current power supply V1 to the power-supply voltage E2 of the second direct-current power supply V2 to the power-supply voltage E3 of the third direct-current power supply V3 is set to 7:5:4. Although a method of setting the ratio of the power-supply voltages to an optimal ratio is described in relation to the first embodiment with reference to FIGS. 13 and 14, this method of searching may be similarly utilized in the second embodiment in which the number of direct-current power supplies is increased. By using the method of searching, the optimal ratio of the power-supply voltage E1:the power-supply voltage E2:the power-supply voltage E3=3: 2.56:1 is derived. At that time, a timing to switch the voltage is also derived together with the optimal ratio of the power-supply voltages.

FIG. 22A illustrates the pseudo sine wave generated by using the power-supply voltage E1, the power-supply voltage E2, and the power-supply voltage E3 of which ratio is set to the optimal ratio. FIG. 22B illustrates the voltage to be supplied from the third direct-current power supply V3 to the load 300, FIG. 22C illustrates the voltage to be supplied from the second direct-current power supply V2 to the load 300, and FIG. 22D illustrates the voltage to be supplied from the first direct-current power supply V1 to the load 300. The control unit 20 controls the first H bridge circuit, the second H bridge circuit, and the third H bridge circuit to switch the voltage to be supplied to the load 300, and according to this, it becomes possible to generate the smooth pseudo sine wave illustrated in FIG. 22A.

Figure 23:
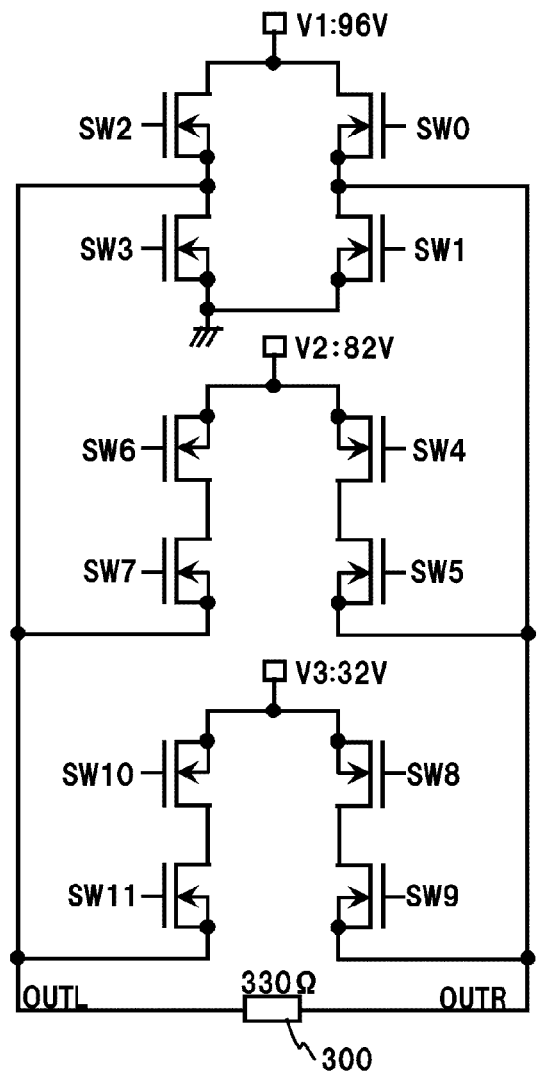
FIG. 23 is a view illustrating an implementation circuit of the inverter according to the second embodiment.

FIG. 23 illustrates an implementation circuit of the inverter 200 according to the second embodiment. The optimal ratio of the three power-supply voltages is realized by setting the power-supply voltage E1 of the first direct-current power supply V1, the power-supply voltage E2 of the second direct-current power supply V2, and the power-supply voltage E3 of the third direct-current power supply V3 to 96V, 82 V, and 32 V, respectively. As compared to FIG. 18, in FIG. 23, the 1-1 switch S11 corresponds to a switch SW0, the 1-2 switch S12 corresponds to a switch SW2, the first common switch S3 corresponds to a switch SW1, the second common switch S4 corresponds to a switch SW3, the 2-1 switch S21 corresponds to switches SW4 and SW5, the 2-2 switch S22 corresponds to switches SW6 and SW7, the 3-1 switch S31 corresponds to switches SW8 and SW9, and the 3-2 switch S32 corresponds to switches SW10 and SW11, respectively.

FIG. 24 is a view illustrating the on/off state of the switch when the inverter 200 illustrated in FIG. 23 generates the seven types of gradation levels. The gradation levels 0, 1, 2, 3, 4, 5, and 6 correspond to the null voltage, the potential difference (E1−E2) (positive), the voltage E3 of the third direct-current power supply V3 (positive), the potential difference (E2−E3) (positive), the potential difference (E1−E3) (positive), the voltage E2 of the second direct-current power supply V2 (positive), and the voltage E1 of the first direct-current power supply V1 (positive), respectively. When the ratio of the three power-supply voltages is set to the optimal ratio, the control unit 20 controls to turn on and off the switches SW0 to SW7 as illustrated in FIG. 24.

In this manner, the control unit 20 changes an output voltage in the order of the null voltage, the potential difference (E1−E2), the voltage E3, the potential difference (E2−E3), the potential difference (E1−E3), the voltage E2, and the voltage E1 during a period from a phase 0 to a phase π/2 of an alternating-current output, that is to say, in a 1/4 cycle. Subsequently, the control unit 20 changes the output voltage to the voltage E1, the voltage E2, the potential difference (E1−E3), the potential difference (E2−E3), the voltage E3, the potential difference (E1−E2), and the null voltage during a period from the phase π/2 to a phase π of the alternating-current output. Subsequently, the control unit 20 changes the output voltage in the order of the null voltage, the potential difference (E2−E1), the voltage (−E3), the potential difference (E3−E2), the potential difference (E3−E1), the voltage (−E2), and the voltage (−E1) during a period from the phase π to a phase (3/2) π of the alternating-current output. Subsequently, the control unit 20 changes the output voltage to the voltage (−E1), the voltage (−E2), the potential difference (E3−E1), the potential difference (E3−E2), the voltage (−E3), the potential difference (E2−E1), and the null voltage during a period from the phase (3/2)π to a phase 2π of the alternating-current output. In this manner, the control unit 20 generates the pseudo sine wave.

Figure 25:
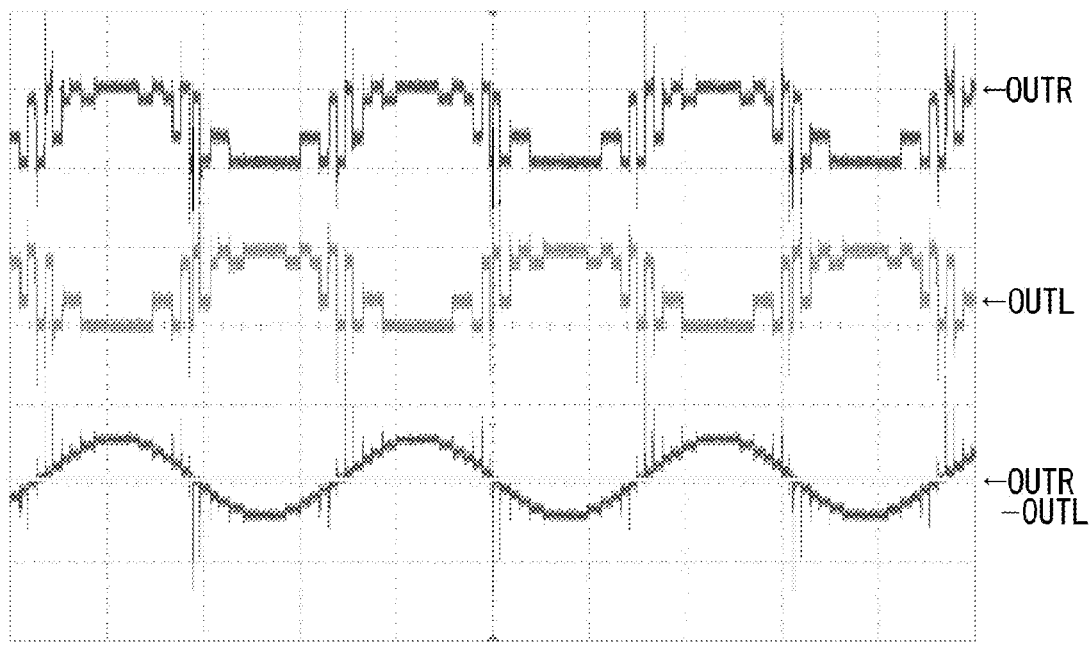
FIG. 25 is a view illustrating a measurement result of an output waveform of the inverter illustrated in FIG. 23.

FIG. 25 illustrates a measured result of an output waveform of the inverter 200 illustrated in FIG. 23. The voltage output to the load 300 is a differential voltage (OUTR−OUTL) between an output voltage (OUTR) on a right side of the load and an output voltage (OUTL) on a left side of the load. Although a differential voltage waveform is the pseudo sine wave, as illustrated, it is understood that this is the output closer to the sine wave because the ratio of the power-supply voltages E1, E2, and E3 is set to the optimal ratio in the second embodiment.

An example in which the number of direct-current power supplies and the number of H bridge circuits used in the inverter 200 are set to three is described in the second embodiment. On this point, it is also possible to set the number of direct-current power supplies and the number of H bridge circuits to four or larger. When the number of direct-current power supplies and the number of H bridge circuits are set to four, it is possible to generate 21 types of voltages.

Hereinafter, relationship between the number of direct-current power supplies and the number of H bridge circuits used in the inverter 200 and the number of gradations is generally described. That is to say, when n (n is an integral number not smaller than 2) direct-current power supplies are used, the inverter 200 is provided with n H bridge circuits. The control unit 20 generates (n×2) types of voltages by the n H bridge circuits and generates ($_nC_2$×2) types of voltages by forming other $_nC_2$H bridge circuits. It is possible to generate (n×2+$_nC_2$×2+1) types of voltages by adding the null voltage to the (n×2) types of voltages and the ($_nC_2$×2) types of voltages. When n=5, it is possible to generate 31 types of voltages, and when n=6, it is possible to generate 43 types of voltages.

Figure 26:
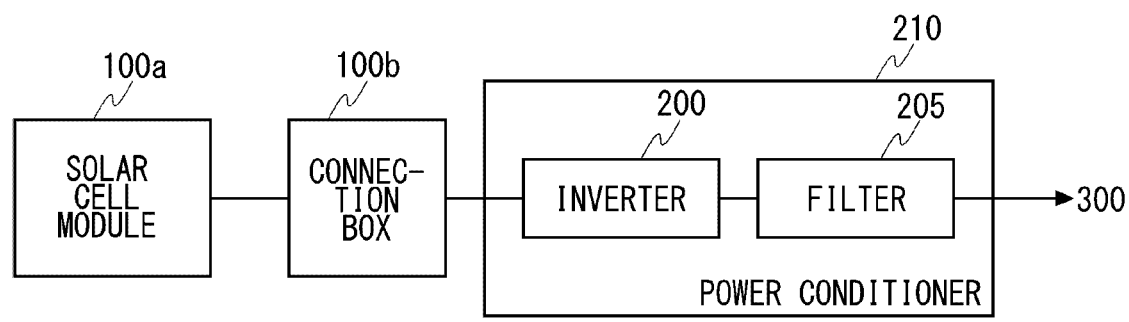
FIG. 26 is a system configuration diagram of a solar power generation system including a power conditioner having the inverter according to the embodiment mounted therein.

FIG. 26 is a system configuration diagram of a solar power generation system 500 including a power conditioner 210 having the inverter 200 according to the embodiments mounted therein. The solar power generation system 500 is provided with a solar cell module 100a, a connection box 100b, and the power conditioner 210. The power conditioner 210 serves as a power converter, which converts the direct-current power to the alternating-current power.

The solar cell module 100a including a plurality of solar panels is installed on a roof of a building and the like. The solar cell module 100a converts solar light to the direct-current power and outputs the same to the connection box 100b.

The connection box 100b assembles wirings from a plurality of solar panels included in the solar cell module 100a. The connection box 100b supplies a plurality of direct-current voltages corresponding to the number of direct-current power supplies used in the inverter 200 according to the embodiments to the power conditioner 210. When the plurality of direct-current voltages may be directly obtained from the plurality of solar panels, it is possible to directly supply them to the power conditioner 210. When not all of the plurality of direct-current voltages are obtained from the plurality of solar panels, the direct-current voltage, which cannot be directly obtained, is generated by using a booster circuit.

The power conditioner 210 is provided with the inverter 200 according to the embodiments and a filter 205. The inverter 200 generates the pseudo sine wave by using a plurality of direct-current voltages supplied from the connection box 100b. The filter 205 smoothes the pseudo sine wave generated by the inverter 200.

As described above, when the inverter 200 tries to generate the smoother sine wave, it is required to increase the number of direct-current power supplies and the number of H bridge circuits used in the inverter 200. However, the smoother the sine wave generated by the inverter 200 is, the lower the strength of the filter 205 on a subsequent stage may be. Therefore, a circuit scale of the inverter 200 and that of the filter 205 are in trade-off relationship.

The alternating-current power generated by the power conditioner 210 is supplied to the load 300. For example, in the solar power generation system 500 for family use, this is supplied to an electric device in-home or to a power grid through a distribution switchboard.

As described above, it is possible to construct the solar power generation system 500 with high energy conversion efficiency by applying the inverter 200 according to the embodiments to the power conditioner 210 for the solar power generation system 500.

The present invention is described above based on some embodiments. The embodiments are illustrative only and one skilled in the art may understand that various modified examples of combination of the components and the processes are possible and that the various modified examples also fall within the scope of the present invention.

In the above-described embodiment, a method of smoothing the pseudo sine wave by increasing the number of gradations is described. In a following description, a method of smoothing the pseudo sine wave without increasing the number of gradations is described.

The control unit 20 generates a pulse width modulation (PWM) signal, in which the voltage of an gradation and the voltage of the adjacent gradation are set to a high level and a low level at least one gradation which composes the pseudo sine wave, and supplies the same to each switch, which composes the inverter 200.

Figure 27A:
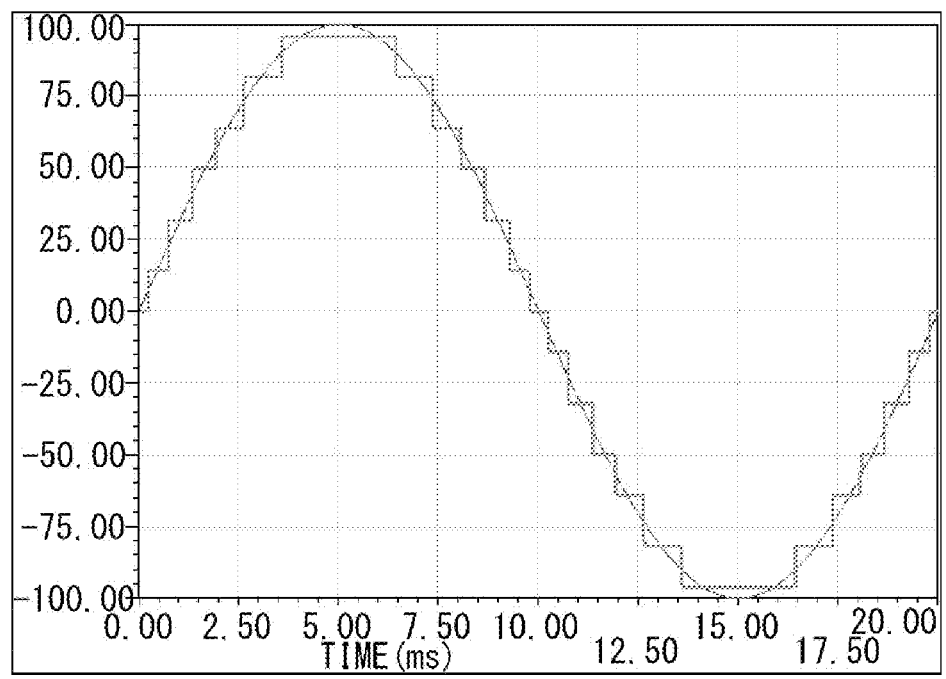
FIGS. 27A and 27B are views illustrating simulation results when the pseudo sine wave (without PWM signal used) is generated by using the implementation circuit of the inverter according to the second embodiment illustrated in FIG. 23.
Figure 27B:
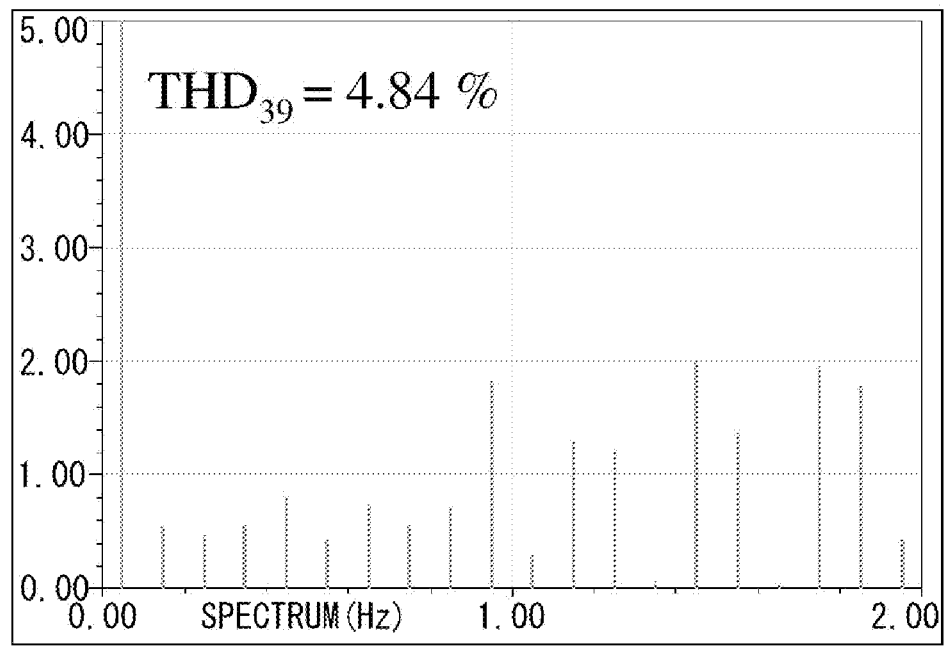

FIGS. 27A and 27B are views illustrating simulation results of a case in which the pseudo sine wave (without PWM signal used) is generated by using the implementation circuit of the inverter 200 according to the second embodiment illustrated in FIG. 23. FIG. 27A illustrates time axis data and FIG. 27B illustrates frequency axis data. As described above, in the second embodiment, the pseudo sine wave is generated by using the 13 types of gradation levels. In the simulation illustrated in FIG. 27B, the result is such that 39th harmonic distortion in the signal is 4.84%.

Figure 28A:
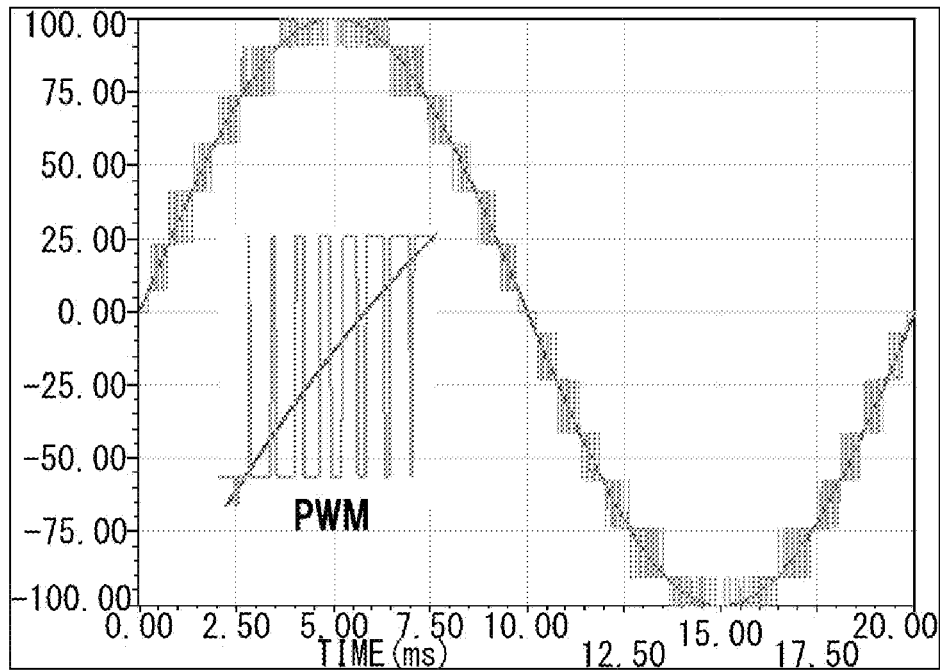
FIGS. 28A and 28B are views illustrating the simulation results when the pseudo sine wave (with PWM signal used) is generated by using the implementation circuit of the inverter according to the second embodiment illustrated in FIG. 23.
Figure 28B:
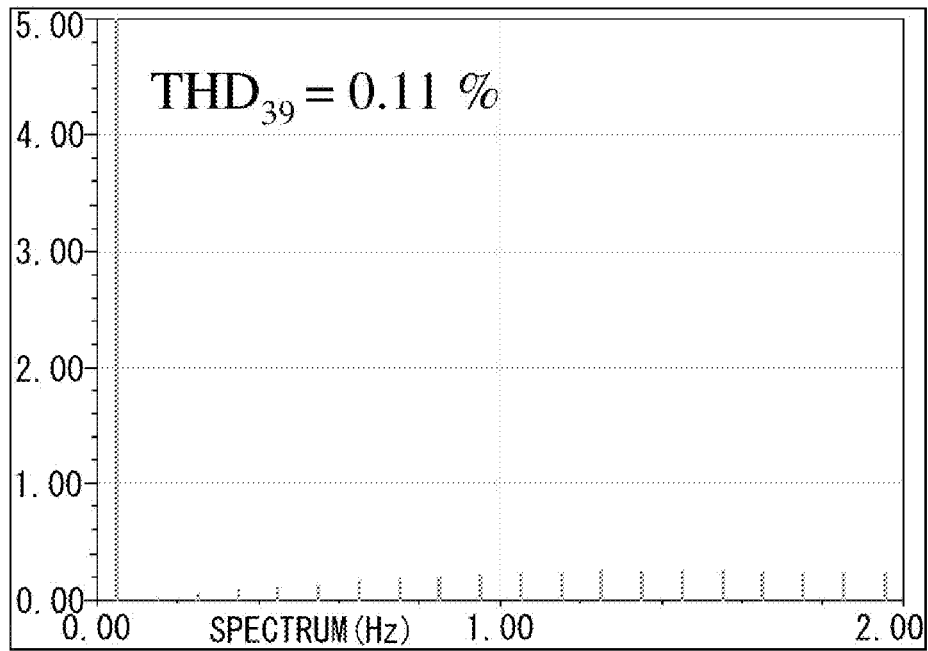

FIGS. 28A and 28B are views illustrating the simulation results of a case in which the pseudo sine wave (with PWM signal used) is generated by using the implementation circuit of the inverter 200 according to the second embodiment illustrated in FIG. 23. FIG. 28A illustrates the time axis data and FIG. 28B illustrates the frequency axis data. In the simulation illustrated in FIG. 28B, the result is such that the 39th harmonic distortion in the signal is 0.11%. In this manner, it is understood that the pseudo sine wave becomes smoother by representing each gradation by the PWM signal if the number of gradations is the same.

Figure 29:
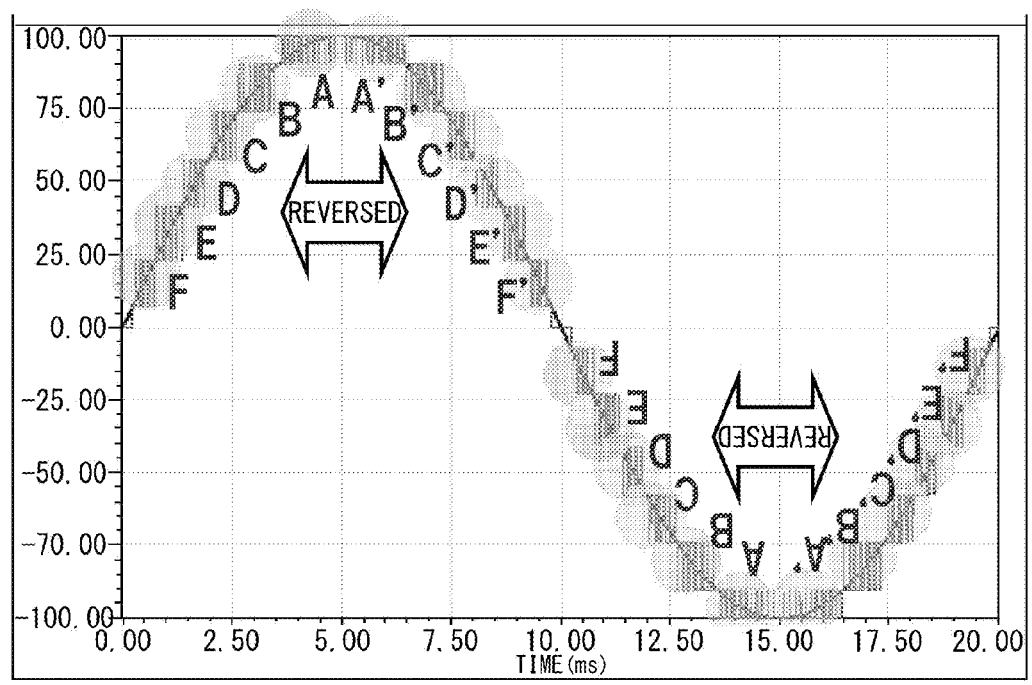
FIG. 29 is a view for illustrating PWM waveform data required when the pseudo sine wave (with PWM signal used) is generated by using the implementation circuit of the inverter according to the second embodiment illustrated in FIG. 23.

FIG. 29 is a view for illustrating PWM waveform data required when generating the pseudo sine wave (with PWM signal used) by using the implementation circuit of the inverter 200 according to the second embodiment illustrated in FIG. 23. Six types of PWM waveform data (A to F) are required for generating the pseudo sine wave by using the 13 types of gradation levels.

During the period from the phase 0 to the phase π/2 of the pseudo sine wave, the null voltage and the six types of PWM waveform data (A to F) are used by being switched in the order from the PWM waveform data F to the PWM waveform data A after the null voltage is used. During the period from the phase π/2 to the phase π, right and left sides of the six types of PWM waveform data (A to F) are reversed and the data are used by being switched in the order from PWM waveform data A' to PWM waveform data F'.

During the period from the phase π to the phase (3/2)π, up and down sides of the six types of PWM waveform data (A to F) are reversed and the data are used by being switched in the order from the PWM waveform data F to the PWM waveform data A. During the period from the phase (3/2)π to the phase 2π, the up and down sides and the right and left sides of the six types of PWM waveform data (A to F) are reversed and the data are used by being switched in the order from the PWM waveform data A' to the PWM waveform data F'.

A table not illustrated is provided outside or inside the control unit 20 and the PWM waveform data is held in the table in units of gradation, which composes the pseudo sine wave. The PWM waveform data of each gradation is designed to be a waveform with which the high-frequency distortion is the smallest by using an existing optimization algorithm.

Meanwhile, it is possible that only basic PWM waveform data required for generating the pseudo sine wave is held in the table or all the PWM waveform data required for generating the pseudo sine wave are held therein. In an example in FIG. 29, it is possible that only the six types of PWM waveform data (A to F) are held or that 24 types of PWM waveform data are held.

The control unit 20 generates the PWM signal for generating the pseudo sine wave by using the PWM waveform data held in the table. When only the basic PWM waveform data is held in the table, the PWM signal is generated by reversing the up and down sides and the right and left sides of the PWM waveform data.

Figure 30:
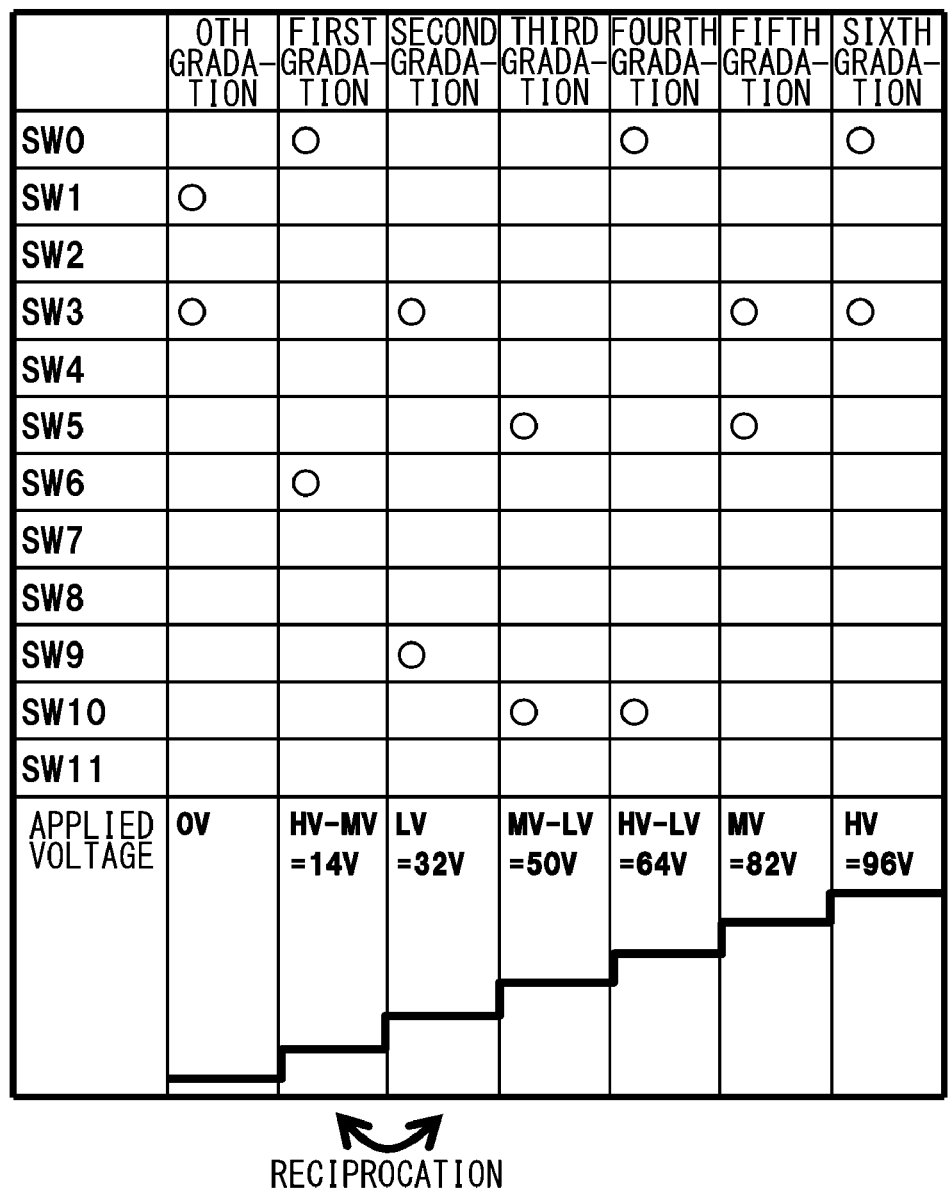
FIG. 30 is a view obtained by adding a level of an applied voltage to a view illustrating the on/off state of the switch when the inverter illustrated in FIG. 23 generates the seven types of gradation levels.

FIG. 30 is a view obtained by adding a level of an applied voltage to a view illustrating the on/off state of the switch when the inverter 200 illustrated in FIG. 23 generates the seven types of gradation levels. It is possible to generate the PWM signal by reciprocating between the applied voltages of adjacent gradations such as between a first gradation and a second gradation and between the second gradation and a third gradation. Meanwhile, in the description below, the voltage E1, the voltage E2, and the voltage E3 described above are represented as a high voltage HV, a middle voltage MV, and a low voltage LV, respectively.

Figure 31:
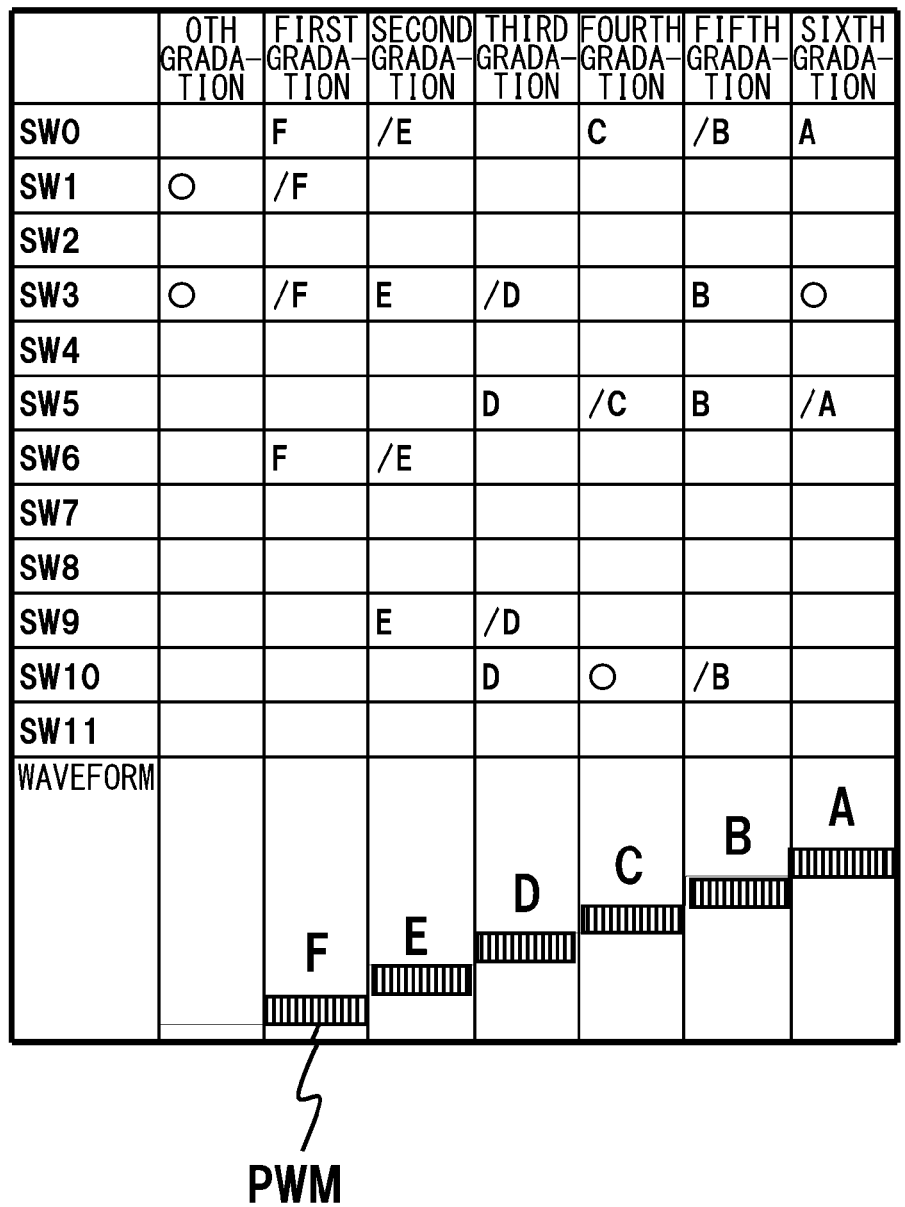
FIG. 31 is a view illustrating a result of generating the PWM signal by using a switching pattern illustrated in FIG. 30.

FIG. 31 is a view illustrating a result of generating the PWM signal by using a switching pattern illustrated in FIG. 30. Meanwhile, "A" to "F" in a graph represent the switching patterns for generating the PWM waveform data (A to F) in FIG. 29. "/A" to "/F" in the graph are the patterns obtained by reversing positive and negative of "A" to "F". For example, in the "second gradation", the SW3 and SW9 are set to "o" in FIG. 30 and set to "E" in FIG. 31. In the "first gradation" in FIG. 30, the SW0 and the SW6 are set to "o". In the "second gradation" in FIG. 31, the SW0 and SW6 are set to "/E".

When it is focused on the "second gradation" in FIG. 31, at the time of the PWM pattern of "E" and at the high level, the SW3 and SW9 are turned on, and at the time of the PWM pattern of "E" and at the low level, "/E" becomes the high level, so that the SW0 and SW6 are turned on. According to this, reciprocation between the "first gradation" and the "second gradation" in FIG. 30 may be realized.

Next, a power supply system 100c suitable for generating the high voltage HV, the middle voltage MV, and the low voltage LV to be supplied to the inverter 200 according to the second embodiment is described.

Figure 32:
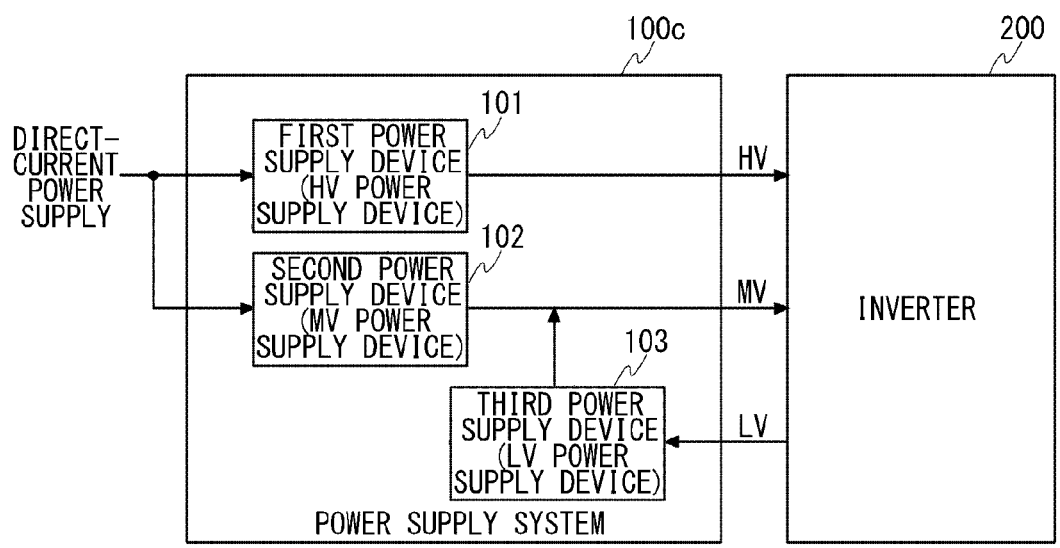
FIG. 32 is a view for illustrating a power supply system suitable for supplying a voltage to the inverter according to the second embodiment.

FIG. 32 is a view for illustrating the power supply system 100c suitable for supplying the voltage to the inverter 200 according to the second embodiment. One type of direct-current voltage is supplied from the direct-current power supply (for example, solar cell or secondary cell such as lithium ion, nickel hydride, and lead) to the power supply system 100c. The power supply system 100c generates the high voltage HV, the middle voltage MV, and the low voltage LV based on the direct-current voltage. The power supply system 100c is provided with three power supply devices: a first power supply device 101 (also referred to as HV power supply device), a second power supply device 102 (also referred to as MV power supply device), and a third power supply device 103 (also referred to as LV power supply device).

The first power supply device 101, the second power supply device 102, and the third power supply device 103 generate the high voltage HV, the middle voltage MV, and the low voltage LV, respectively, to supply to the inverter 200. Hereinafter, an example in which the high voltage HV, the middle voltage MV, and the low voltage LV are set to 48 V, 41 V, and 16 V, respectively, is described.

Each of the first power supply device 101 and the second power supply device 102 is composed of a general power supply device including a boost DC-DC converter (also referred to as boost chopper). A configuration of the third power supply device 103 is to be described later.

Figure 33:
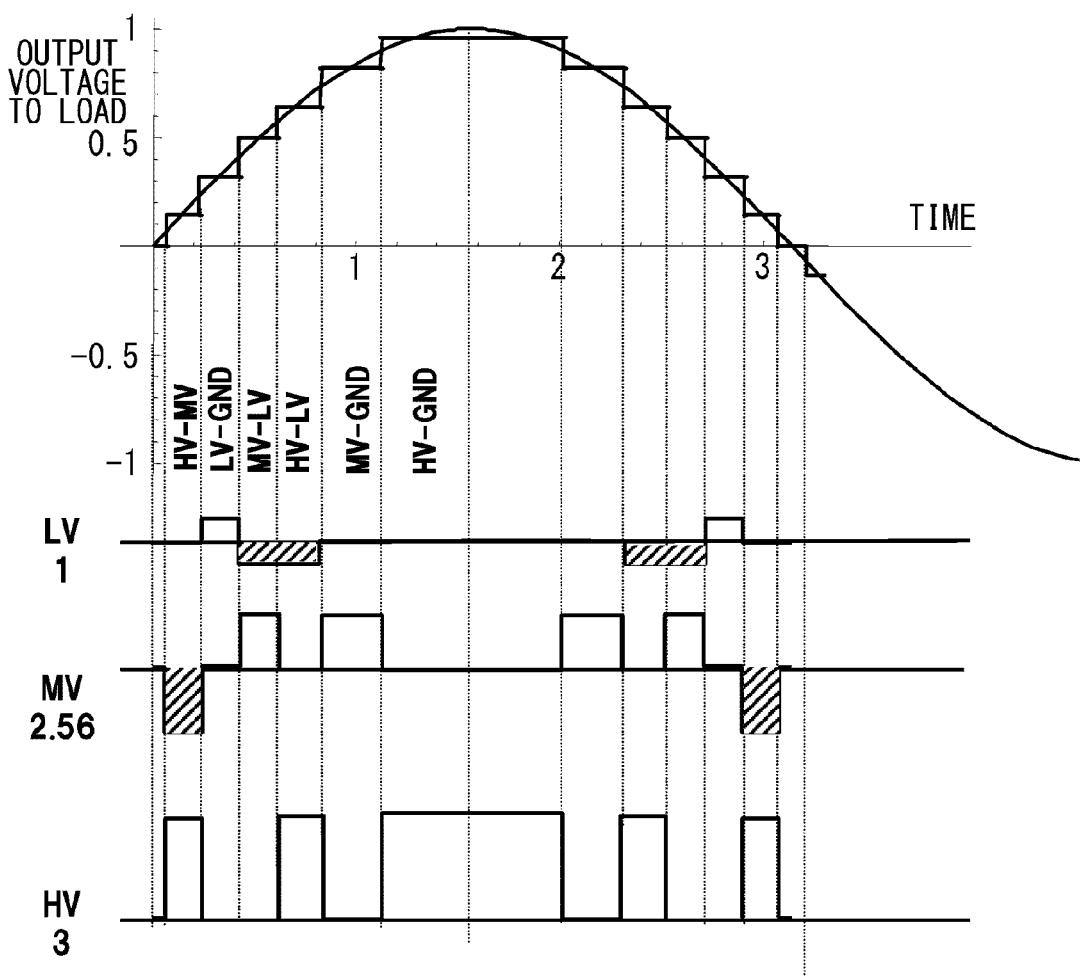
FIG. 33 is a view illustrating the pseudo sine wave generated by the inverter.

FIG. 33 is a view illustrating the pseudo sine wave generated by the inverter 200. As described above, in this setting example, "high voltage HV:middle voltage MV: low voltage LV=48 V:41 V:16 V=3:2.56:1" is satisfied. The current flows from systems of the high voltage HV and the middle voltage MV to a node, which should be kept at the low voltage LV (refer to shaded area in FIG. 33). That is to say, relationship of inflow current>outflow current is satisfied on average. Although the current flows from the system of the high voltage HV into the node, which should be kept at the middle voltage MV, this allows the current to flow out to the node, which should be kept at a ground GND and the low voltage LV, so that relationship of inflow current<outflow current is satisfied on average in one cycle.

Figure 34:
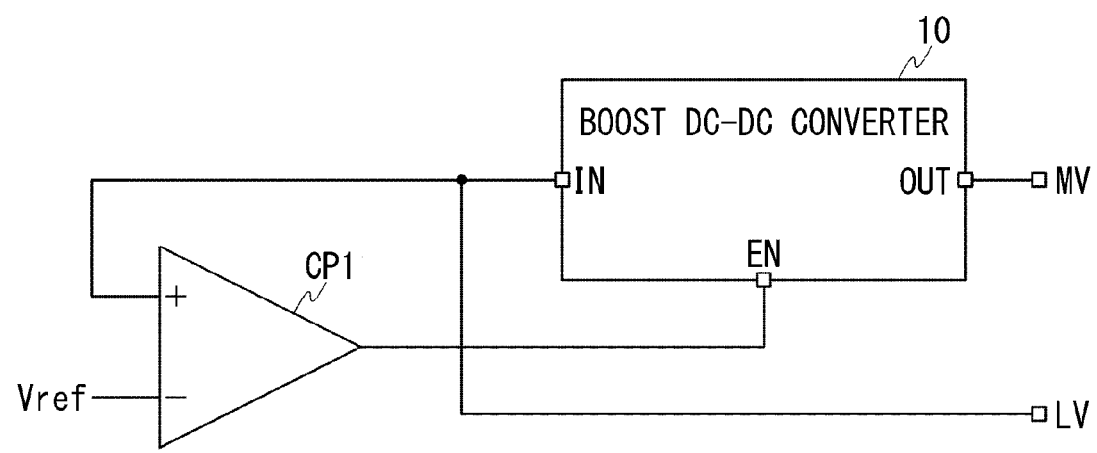
FIG. 34 is a view illustrating a basic circuit configuration of a third power supply device.

FIG. 34 is a view illustrating a basic circuit configuration of the third power supply device 103. The third power supply device 103 is provided with a comparator CP1 and a boost DC-DC converter 10. The comparator CP1 compares the voltage at the node into which the current flows from the system of the middle voltage MV with a reference voltage Vref for keeping the node at the low voltage LV.

In the circuit configuration in FIG. 34, the comparator CP1 is composed of an operation amplifier to a non-inverting input terminal of which the voltage at the above-described node is applied, and to an inverted input terminal of which the reference voltage Vref is applied. A high level signal is output when the voltage at the node is larger than the reference voltage Vref, and a low level signal is output when the former is not larger than the latter.

The boost DC-DC converter 10 receives the voltage at the node input to the comparator CP1, boosts the voltage to a voltage higher than the middle voltage MV, and applies the same to the system of the middle voltage MV. The boost DC-DC converter 10 enables a boosting function when the voltage at the node is higher than the reference voltage Vref as a result of comparison by the comparator CP1, and disables the boosting function when the voltage at the node is not larger than the reference voltage Vref. In the circuit configuration in FIG. 34, the boosting function of the boost DC-DC converter 10 is enabled when the high level signal is input from the comparator CP1, and this is disabled when the low signal is input.

The voltage boosted by the boost DC-DC converter 10 is applied to an output system of the second power supply device 102, and according to this, charge accumulated in the node, which should be kept at the low voltage LV, is returned to the system of the middle voltage MV. For this, it is required that the boost DC-DC converter 10 boosts up to the voltage larger than the middle voltage MV (41 V in this setting example) to allow the current to flow from the boost DC-DC converter 10 to the output system of the second power supply device 102.

Figure 35:
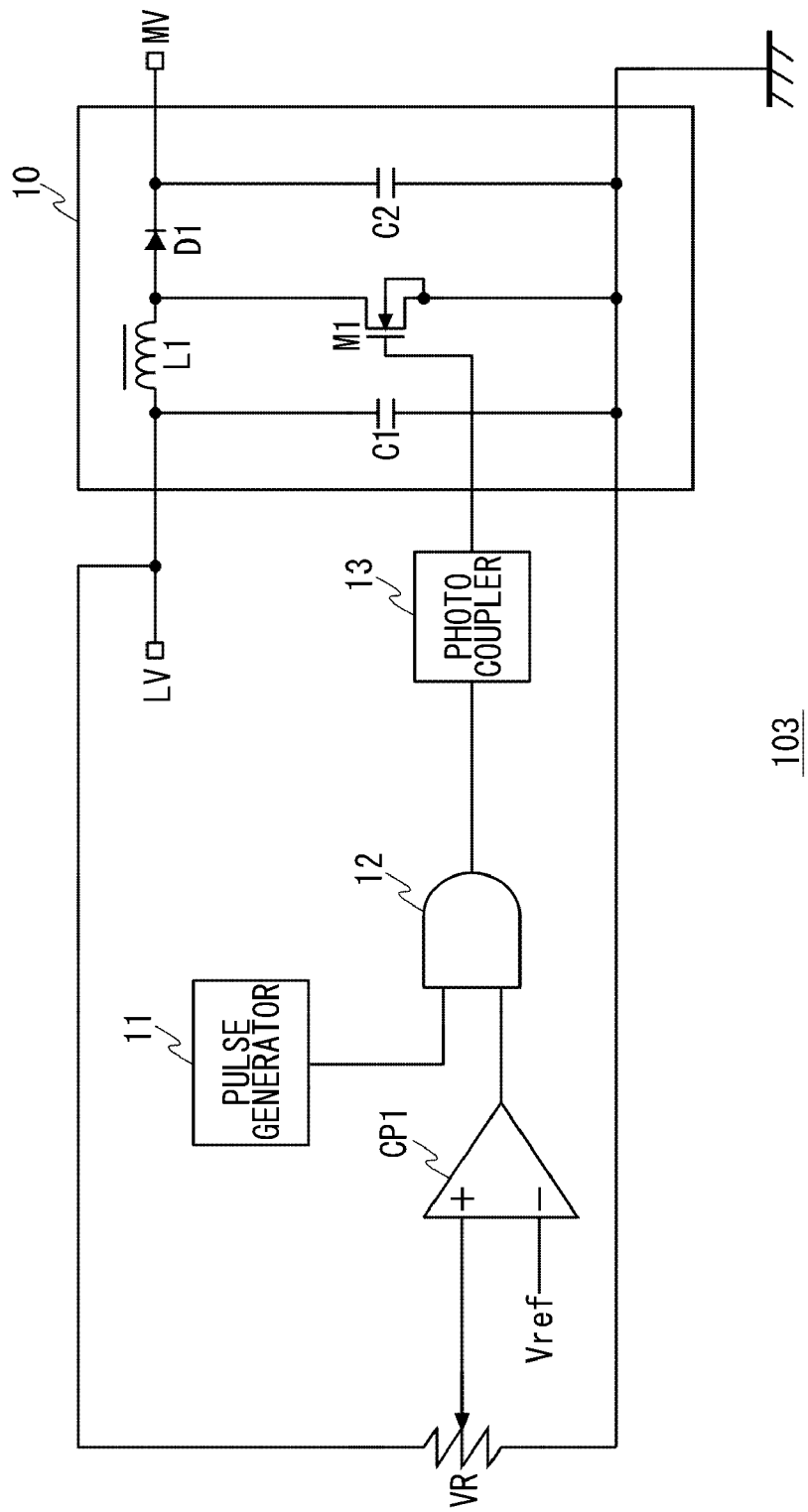
FIG. 35 is a view illustrating a specific circuit configuration example of the third power supply device.

FIG. 35 is a view illustrating a specific circuit configuration example of the third power supply device 103. The third power supply device 103 includes the comparator CP1, a variable resistor VR, the boost DC-DC converter 10, a pulse generator 11, an AND gate 12, and a photo coupler 13.

The reference voltage Vref applied to the inverting input terminal of the comparator CP1 is generated by resistor division not illustrated of the power-supply voltage (for example, 5 V) of the circuit configuration illustrated in FIG. 35. For example, this is set to 2.5 V. The low voltage LV is resistor divided by the variable resistor VR to be applied to the non-inverting input terminal of the comparator CP1. The variable resistor VR resistor divides such that the low voltage LV conforms to the reference voltage Vref when this is an ideal value.

The pulse generator 11 (for example, function generator) generates a pulse signal. The AND gate 12 receives the pulse signal generated by the pulse generator 11 and a comparison result signal output from the comparator CP1 (used as enable signal).

The AND gate 12 outputs an output signal of the pulse generator 11 without change when the output signal of the comparator CP1 is at the high level and outputs the low level when the output signal of the comparator CP1 is at the low level. The output signal of the AND gate 12 is input to a switching element M1 to be described later through the photo coupler 13.

In this manner, the AND gate 12 supplies the pulse signal to the switching element M1 when the voltage at the above-described node (more strictly, low voltage LV divided by variable resistor VR) is higher than the reference voltage Vref and supplies an off signal (low level) to the switching element M1 when the voltage at the node is not higher than the reference voltage Vref.

The boost DC-DC converter 10 includes an inductor L1, a diode D1, the switching element M1, a first capacitor C1, and a second capacitor C2. A series circuit of the inductor L1 and the diode D1 is provided between an input terminal connected to the node into which the current flows (controlled to keep low voltage LV) and an output terminal connected to the system of the middle voltage MV, which allows the current to flow out.

The switching element M1 (composed of power MOSFET in FIG. 35) is provided between a connection point of the inductor L1 and the diode D1 and predetermined fixed potential (ground in FIG. 35). The boost DC-DC converter 10 starts boost operation when the pulse signal is input to the switching element M1 (gate terminal of power MOSFET in FIG. 35) and stops the same when the off signal is input.

The first capacitor C1 is provided between the input terminal of the boost DC-DC converter 10 and the fixed potential to smooth the voltage of the input terminal. The second capacitor C2 is provided between the output terminal of the boost DC-DC converter 10 and the fixed potential to smooth the voltage of the output terminal.

As described above, the third power supply device 103 may inhibit generation of waste power consumption by keeping the voltage at the node into which the current flows constant by using an input side of the boost DC-DC converter and circulating excessive charge back to its source by using the boosting function thereof.

That is to say, when the potential at the node increases by inflow of the charge to the node to be larger than reference potential, the output of the comparator is inverted to a significant level (high level in the above-described example). According to this, the boost DC-DC converter is activated. That is to say, the output of the comparator is the enable signal of the boost DC-DC converter.

When the output voltage of the boost DC-DC converter becomes larger than the voltage of the above-described source by start of the operation of the boost DC-DC converter, the current flows to the source and the potential at the above-described node decreases. When the potential at the node becomes lower than the reference potential of the comparator, the operation of the boost DC-DC converter stops. Therefore, it is possible to keep the potential at the node constant. Also, since the excessive charge accumulated in the node is circulated back to its source, the waste power consumption is not at all generated in principle.

Figure 36:
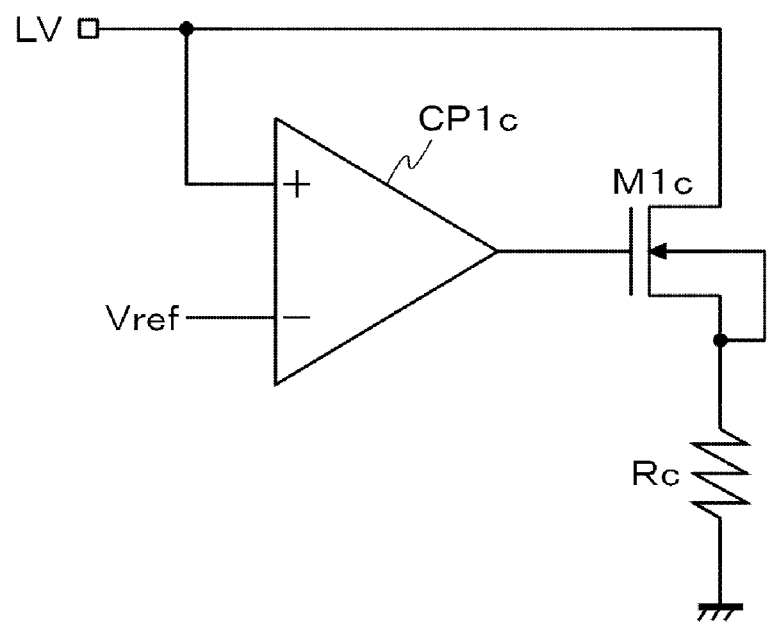
FIG. 36 is a view illustrating a circuit configuration, which should be compared to the circuit configuration of the third power supply device illustrated in FIG. 34.

FIG. 36 is a view illustrating a circuit configuration, which should be compared to the circuit configuration of the third power supply device 103 illustrated in FIG. 34. A third power supply device 103c according to the comparative example also may keep the potential at the node into which the current flows constant. The third power supply device 103c includes a comparator CP1c, a switching element M1c, and a resistance Rc.

The voltage input to the comparator CP1c is the same as that of the circuit configuration illustrated in FIG. 36. An output terminal of the comparator CP1c is connected to a control terminal of the switching element M1c (gate terminal of power MOSFET in FIG. 36). An input terminal of the switching element M1c (drain terminal of power MOSFET in FIG. 36) is connected to the above-described node and an output terminal thereof (source terminal of power MOSFET in FIG. 36) is grounded through the resistance Rc.

When the excessive charge flows into the node, the switching element M1c is turned on and the charge flows to the resistance Rc to be emitted as Joule heat. In this manner, when the circuit configuration in FIG. 36 and the circuit configuration in FIG. 34 are compared to each other, it is understood that the former consumes waste energy and the latter does not generate energy loss in principle.

Although the example in which the low-potential-side paths are shared by all the H bridge circuits included in the inverter 200 is described in the above-described first and second embodiments, the circuit configuration in which they are not shared is also included in the present invention. The circuit configuration in which a part of the low-potential-side paths is shared by all the H bridge circuits and the rest thereof is not shared is also included in the present invention.

Although the example in which the inverter 200 according to the embodiments is applied to the power conditioner 210 for the solar power generation system 500 is described, this is not limitation, and this may be applied to a voltage sag compensator, an uninterruptible power supply (UPS), and another device.

DESCRIPTION OF REFERENCE NUMERALS 100 direct-current power supply unit, 200 inverter, V1 first direct-current power supply, V2 second direct-current power supply, V3 third direct-current power supply, S11 1-1 switch, S12 1-2 switch, S21 2-1 switch, S22 2-2 switch, S31 3-1 switch, S32 3-2 switch, S3 first common switch, S4 second common switch, 20 control unit, 100a solar cell module, 100b connection box, 205 filter, 210 power conditioner, 300 load, 500 solar power generation system

What is claimed is:

1. An inverter that generates a pseudo sine wave as an alternating-current voltage output and applies the pseudo sine wave to a load, the inverter comprising:
    a switching element S11 and a switching element S12;
    a switching element S21 and a switching element S22;
    a first common switching element S3 and a second common switching element S4; and
    a controller, wherein
    the switching element S11 is inserted into a path connecting a high-potential-side terminal of a first direct-current power supply V1 and a high-potential-side terminal of the load,
    the switching element S12 is inserted into a path connecting the high-potential-side of the first direct-current power supply V1 and a low-potential-side terminal of the load,
    the switching element S21 and the switching element S22 are provided in parallel between a high-potential-side of a second direct-current power supply V2 and the load,
    the first common switching element S3 and the second common switching element S4 are provided in parallel between a low-potential side of the second direct-current power supply V2 and the load,
    the controller generates a voltage E1 from the first direct-current power supply V1 by controlling the switching element S11, the switching element S12, the first common switching element S3, and the second common switching element S4, and applies the voltage E1 to the load,
    the controller generates a voltage E2 from the second direct-current power supply V2 by controlling the switching element S21, the switching element S22, the first common switching element S3, and the second common switching element S4, and applies the voltage E2 to the load,
    the controller generates a voltage differential voltage (E1−E2) between the first direct-current power supply V1 and the second direct-current power supply V2 by controlling the switching element S11, the switching element S12, the switching element S21, and the switching element S22, while turning off the first common switching element S3 and the second common switching element S4, and generates the differential voltage (E1−E2) to the load, and
    the controller generates the pseudo sine wave and applies the pseudo sine wave to the load by alternately applying the voltage E1, the voltage E2, and the differential voltage (E1−E2).

2. The inverter according to claim 1, wherein
    the controller generates the differential voltage (E1−E2) between the first direct-current power supply V1 and the second direct-current power supply V2 and applies the differential voltage (E1−E2) to the load, either by:
    turning on the switching element S11 and the switching element S22 and turning off the switching element S12 and the switching element S21, while turning off the first common switching element S3 and the second common switching element S4; or
    turning on the switching element S12 and the switching element S21 and turning off the switching element S11 and the switching element S22, while turning off the first common switching element S3 and the second common switching element S4.

3. The inverter according to claim 1, wherein the voltage E1 and the voltage E2 are related to each other such that E1>E2.

4. The inverter according to claim 3, wherein the controller generates the pseudo sine wave by changing an output voltage in the order of a null voltage, the differential voltage (E1−E2), the voltage E2, and the voltage E1 during a period from a phase 0 to a phase π/2 of the alternating-current voltage output, that is, a 1/4 cycle.

5. The inverter according to claim 4, comprising the first direct-current power supply V1 and the second direct-current power supply V2, wherein
   denoting an area enclosed by a sine wave from a phase 0 to a phase π/2, an x axis, and x=π/2 as S1, and
   denoting an area enclosed by the pseudo sine wave, the x axis, and x=π/2 as S2,
   the first direct-current power supply V1 and the second direct-current power supply V2 meet a ratio between the voltage E1 and the voltage E2 that minimizes a difference between the area S1 and the area S2.

* * * * *